United States Patent
Fink et al.

(10) Patent No.: US 9,843,725 B2
(45) Date of Patent: Dec. 12, 2017

(54) OMNIDIRECTIONAL CAMERA WITH MULTIPLE PROCESSORS AND/OR MULTIPLE SENSORS CONNECTED TO EACH PROCESSOR

(71) Applicant: VideoStitch Inc., San Francisco, CA (US)

(72) Inventors: Alexander Fink, San Jose, CA (US); Nicolas Burtey, Montreuil (FR); George Haber, Los Altos Hills, CA (US); Stephane Valente, Paris (FR)

(73) Assignee: VIDEOSTITCH INC., San Francisco, CA (US)

( * ) Notice: Subject to any disclaimer, the term of this patent is extended or adjusted under 35 U.S.C. 154(b) by 58 days.

(21) Appl. No.: 14/982,191

(22) Filed: Dec. 29, 2015

(65) Prior Publication Data

US 2017/0187955 A1 Jun. 29, 2017

(51) Int. Cl.
*H04N 5/232* (2006.01)
*H04N 5/262* (2006.01)
*H04N 5/225* (2006.01)
*H04L 12/10* (2006.01)

(52) U.S. Cl.
CPC ......... *H04N 5/23238* (2013.01); *H04L 12/10* (2013.01); *H04N 5/2258* (2013.01); *H04N 5/23206* (2013.01); *H04N 5/2628* (2013.01)

(58) Field of Classification Search
CPC ............. H04N 5/23238; H04N 5/2258; H04N 5/23206; H04N 5/2628; H04L 12/10
See application file for complete search history.

(56) References Cited

U.S. PATENT DOCUMENTS

| | | | |
|---|---|---|---|
| 6,424,377 B1 * | 7/2002 | Driscoll, Jr. .......... | G02B 13/06 348/207.99 |
| 6,552,744 B2 * | 4/2003 | Chen .................. | H04N 5/23293 346/36 |
| 7,864,215 B2 * | 1/2011 | Carlsson ............ | H04N 5/23238 348/159 |

(Continued)

OTHER PUBLICATIONS

Ganesh, T.S., "Zotac Zbox Magnus EN970 Review—A Gaming mini-PC Done Right", http://www.anandtech.com/Show/9660/zotac-zbox-magnus-en970-review-a-gaming-minipc-done-right, Sep. 28, 2015, 3 pages.

(Continued)

*Primary Examiner* — Tuan Ho

(74) *Attorney, Agent, or Firm* — Christopher P. Maiorana, PC

(57) ABSTRACT

An apparatus comprising a plurality of image modules and a plurality of processors. The image modules may each comprise (i) a sensor configured to generate images and (ii) a lens mounted to the sensor. The processors may each be configured to (A) receive the images from a subset of the plurality of image modules and (B) generate a plurality of video streams. Each one of the video streams may be generated by one of the processors in response to the images received from one of the image modules. The subset of the plurality of image modules may comprise at least two distinct image modules of the plurality of image modules. The lenses may be arranged to allow the images to provide coverage for a spherical field of view of a scene surrounding the apparatus.

20 Claims, 15 Drawing Sheets

(56) References Cited

U.S. PATENT DOCUMENTS

RE43,490 E     6/2012   Gullichsen et al. ..... 348/207.99
2002/0135682 A1    9/2002   Oka et al. .................. 348/211.3

OTHER PUBLICATIONS

IMX123LQT, "Diagonal 6.46 mm (Type 1/2.8) Approx. 3.21 M-Effective Pixel Color CMOS Image Sensor", http://www.sony.net/Products/SC-HP/new_pro/june_2014/imx123_e.html, Apr. 2014, 4 pages.

* cited by examiner

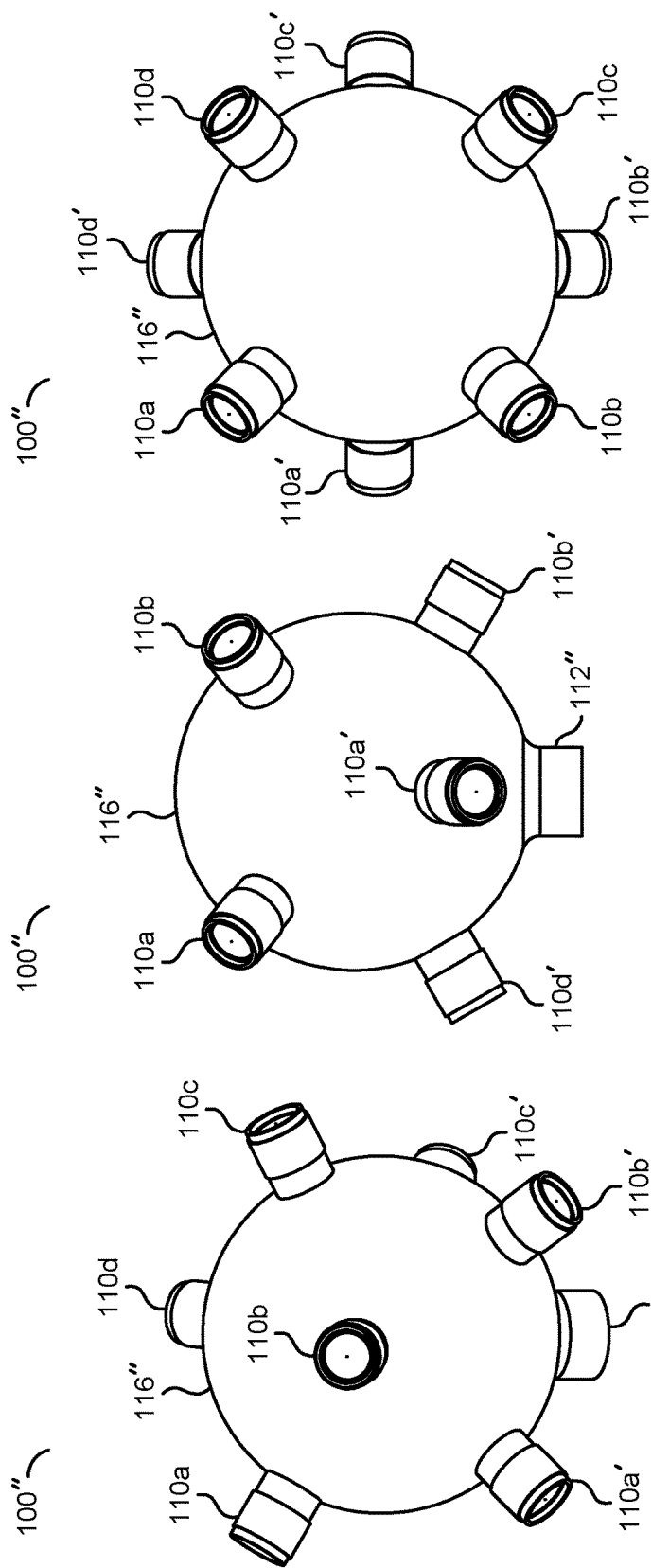

OMNIDIRECTIONAL CAMERA WITH MULTIPLE PROCESSORS AND/OR MULTIPLE SENSORS CONNECTED TO EACH PROCESSOR

FIELD OF THE INVENTION

The invention relates to an omnidirectional camera generally and, more particularly, to a method and/or apparatus for implementing an omnidirectional camera with multiple processors and/or multiple sensors connected to each processor.

BACKGROUND

Conventional omnidirectional cameras (also known as virtual reality cameras, spherical cameras, panorama cameras, immersive video cameras, or 360 cameras) present design challenges. A single lens cannot capture an entire spherical field of view. The purpose of omnidirectional cameras is to capture video in all directions surrounding the camera (i.e., 360 degrees in each axis). The video captured represents a complete view of a scene surrounding the person watching the video. A user typically uses a head-mounted display or an interactive video player to view the captured video on playback. The video orientation can be changed in any direction during playback.

Conventional solutions previously considered include placing a convex mirror in front of the lens to capture more of the scene. However, using a convex mirror in front of the lens only provides a 360 degree horizontal coverage while losing the top and bottom of a spherical field of view. Conventional solutions previously considered also include capturing images from multiple lenses into several video signals. However, using several video signals creates several issues such as issues with processing all the video signals using a single processor, producing multiple video files using a single processor, providing dedicated processors for each video signal, and managing multiple video files from various processors and video signals.

Several conventional approaches have been attempted by commercial products. Most conventional approaches fall into one of several categories. In one conventional approach, each lens is mounted on a sensor, which is connected to a dedicated processor. Each processor records one video file onto a storage medium. After recording is done, all files are transferred out of the storage medium to a computer or cloud. Stitching the multiple files to create a spherical field of view is only done as a post-production process.

In another conventional approach, each lens is mounted on a sensor. All of the sensors in the system are connected to a single processor. The processor records multiple video files onto a storage medium. After recording is done, all files are transferred out of the storage medium to a computer or cloud. Stitching the multiple files to create a spherical field of view is only done as a post-production process.

It would be desirable to implement an omnidirectional camera with multiple processors and/or multiple sensors connected to each processor.

SUMMARY

The invention concerns an apparatus comprising a plurality of image modules and a plurality of processors. The image modules may each comprise (i) a sensor configured to generate images and (ii) a lens mounted to the sensor. The processors may each be configured to (A) receive the images from a subset of the plurality of image modules and (B) generate a plurality of video streams. Each one of the video streams may be generated by one of the processors in response to the images received from one of the image modules. The subset of the plurality of image modules may comprise at least two distinct image modules of the plurality of image modules. The lenses may be arranged to allow the images to provide coverage for a spherical field of view of a scene surrounding the apparatus.

BRIEF DESCRIPTION OF THE FIGURES

Embodiments of the invention will be apparent from the following detailed description and the appended claims and drawings in which:

FIG. 10 is a diagram illustrating an isometric view of an example 8-lens embodiment of an omnidirectional camera;
FIG. 11 is a diagram illustrating a side view of an example 8-lens embodiment of an omnidirectional camera;
FIG. 12 is a diagram illustrating a top view of an example 8-lens embodiment of an omnidirectional camera.

DETAILED DESCRIPTION OF THE EMBODIMENTS

Embodiments of the invention include providing an omnidirectional camera that may (i) implement multiple processors, (ii) implement multiple sensors connected to each processor, (iii) process data without local storage, (iv) encode and transfer multiple video streams in real-time before all recording is complete, (v) generate a single video file representing a spherical field of view from multiple video streams, (vi) synchronize captured video streams from various directions to allow video stitching in real-time, and/or (viii) be implemented as one or more integrated circuits.

Figure 1:
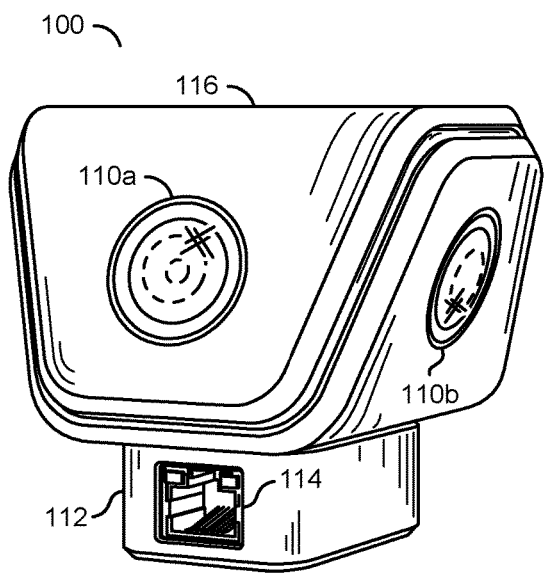
FIG. 1 is a diagram of a camera.

Referring to FIG. 1, a block diagram of a camera 100 is shown in accordance with an embodiment of the invention. The camera 100 is shown having a first lens 110a, a second lens 110b, an interface 114, a neck 112 and a frame 116. The embodiment shown in FIG. 1 shows the lenses 110a and 110b. More lenses may be implemented. The frame (or casing) 116 may be configured to secure the lenses 110a and 110b (and other additional lenses). For example, lenses may be arranged to provide coverage for a spherical field of view of a scene surrounding the camera 100. In another example, the frame 116 may comprise a cover and a core (e.g., a solid core) inside the camera 100 configured to secure the lenses 110a and 110b (and other additional lenses). In some embodiments, the lenses may provide a scene surrounding the camera 100 in all directions. The neck 112 may provide a mounting interface. For example, a bottom of the neck 112 may provide mechanical connections to mount the camera 100 on a tripod.

Figure 2:
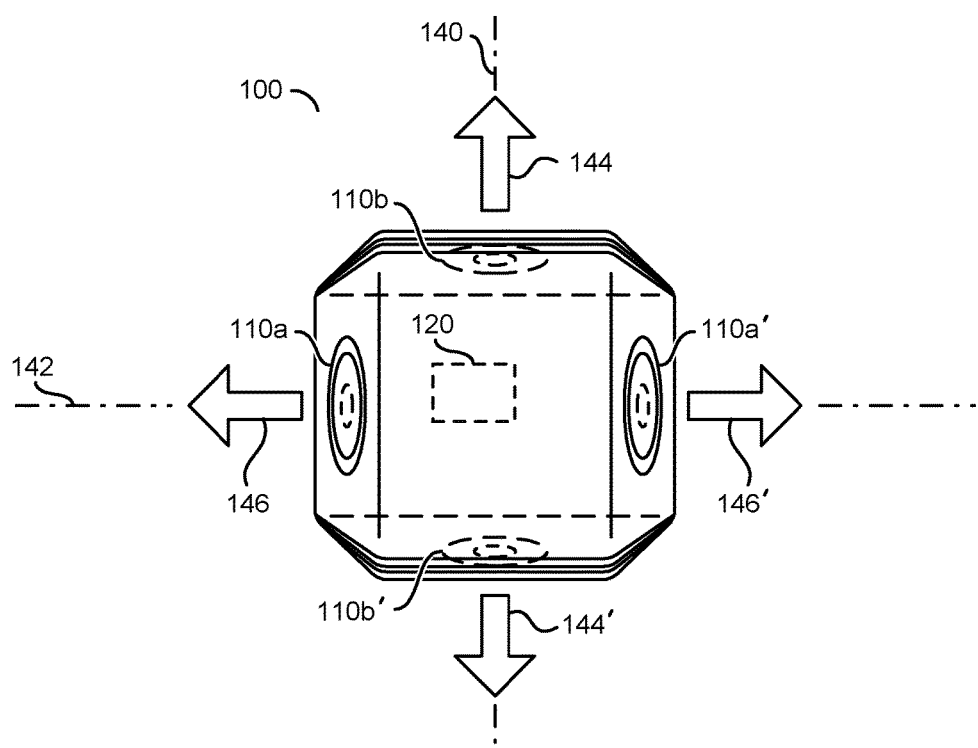
FIG. 2 is a diagram of top view of a camera.

Referring to FIG. 2, a top view of the camera 100 is shown. The top view of the camera 100 shows an axis 140, an axis 142 and a block (or circuit) 120. The lens 110b is shown pointed in a direction 144 along the axis 140. The lens 110b' is shown pointed in a direction 144' along the axis 140. In general, the lens 110b and the lens 110b' point in opposite directions along the axis 140.

The lens 110a is shown pointed in a direction 146 along the axis 142. Similarly, the lens 110a' is shown pointed in a direction 146' along the axis 142. In general, the lens 110a and the lens 110a' point in opposite directions along the axis 142.

In general, the axis 140 and the axis 142 are configured in a 90 degree configuration in the horizontal plane. In some embodiments, the lens 110a and the lens 110a' may be implemented in a 90 degree configuration and the lens 110b and the lens 110b' may be implemented in a 90 degree configuration in the horizontal plane. However, an angle between the lenses 110a and 110a' or the lenses 110b and 110b' may be larger (e.g., if the lenses 110a and 110a' or 110b and 110b' are titled in relation to each other). The particular orientation of the axis 140 and the axis 142 and/or the lenses 110a-110a' and the lenses 110b-110b' may be varied to meet the design criteria of a particular implementation.

Figure 3:
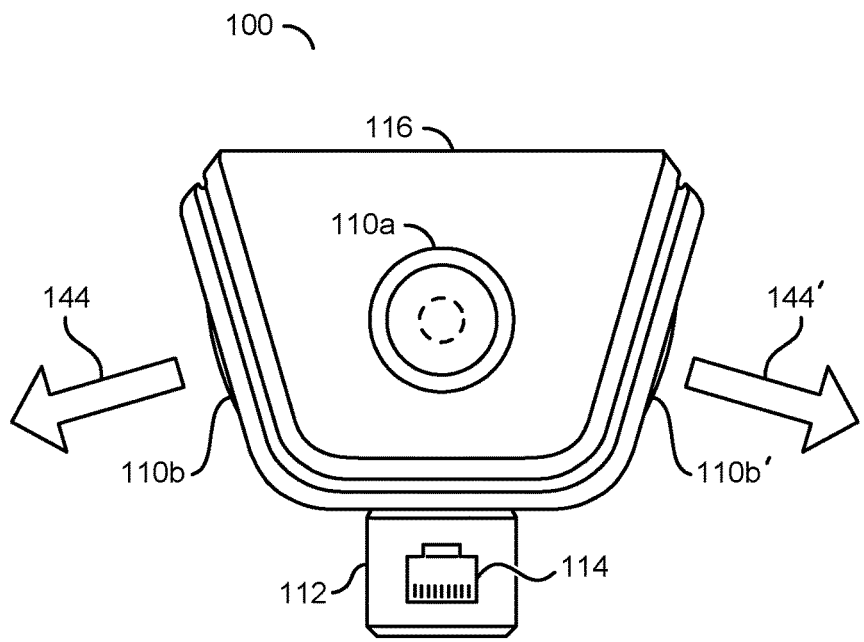
FIG. 3 is a diagram of a side view of a camera.

Referring to FIG. 3, a first side view of the camera 100 is shown. The direction 144 of the lens 110b and the direction 144' of the lens 110b' are shown at a slightly downward angle. The slightly downward angle of the lenses 110b-110b' may allow the lenses of the camera 100 to provide coverage for a spherical (or omnidirectional) field of view of a scene surrounding the camera 100. In some embodiments, the lenses 110b-110b' may capture a portion of a scene surrounding the camera 100 in all directions.

Figure 4:
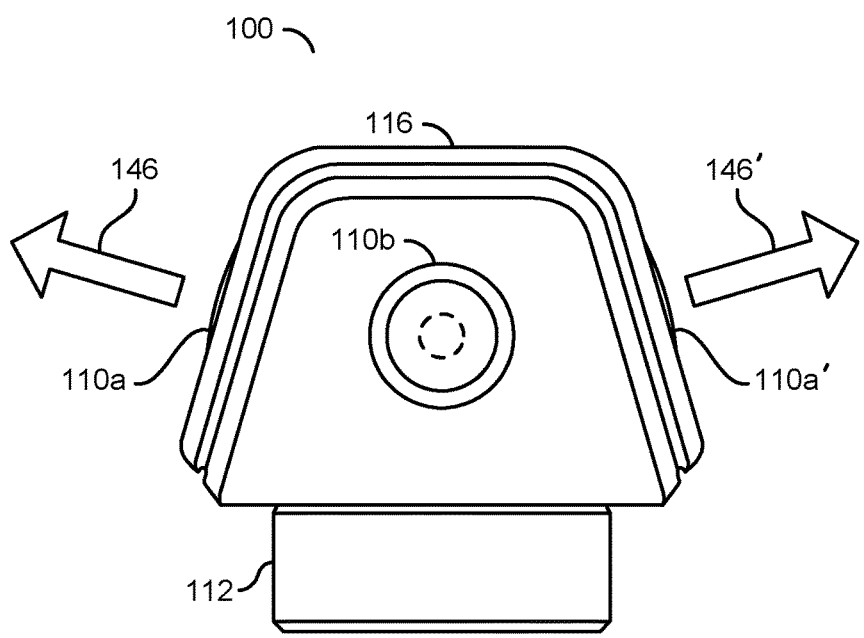
FIG. 4 is a diagram of another side view of a camera.

Referring to FIG. 4, a second side view of the camera 100 is shown. The direction 146 of the lens 110a is shown at a slightly upward angle. The direction 146' of the lens 110a' is shown at a slightly upward angle. The slightly upward angle of the lenses 110a-110a' may allow the lenses of the camera 100 to provide coverage for a spherical field of view of a scene surrounding the camera 100. In some embodiments, the lenses 110a-110a' may capture a portion of a scene surrounding the camera 100 in all directions. For example, the combined upward angle of the lenses 110a-110a' and the downward angle of the lenses 110b-110b' may allow the camera 100 to capture images above and below a height of the camera 100.

Figure 5:
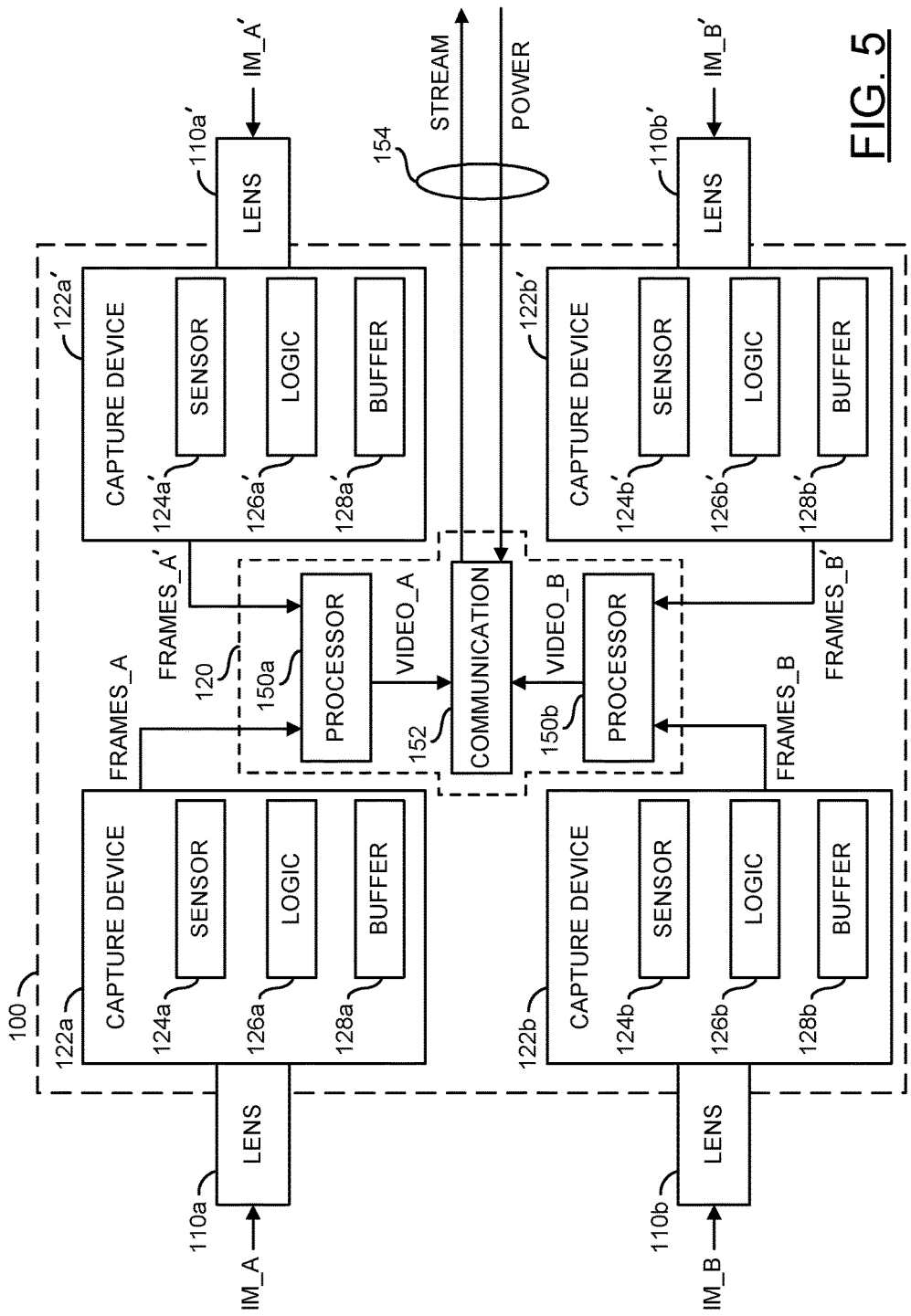
FIG. 5 is a diagram illustrating example internal components of a camera.

Referring to FIG. 5, example internal components of the camera 100 are shown. The internal components of the camera 100 may comprise a block (or circuit) 122a, a block (or circuit) 122a', a block (or circuit) 122b, a block (or circuit) 122b' and the circuit 120. The circuits 122a, 122a', 122b and/or 122b' may be implemented as capture devices (e.g., image modules). The capture device 122a may be associated with the lens 110a. The capture device 122a' may be associated with the lens 110a'. Similarly, the capture device 122b may be associated with the lens 110b. The capture device 122b' may be associated with the lens 110b'.

The capture device 122a generally comprises a block (or circuit) 124a, a block (or circuit) 126a and a block (or circuit) 128a. The circuit 124a may be implemented as a sensor. For example, the lens 110a may be mounted to the sensor 124a. The circuit 126a may be implemented as logic. The circuit 128a may be implemented as a buffer. The capture devices 122a', 122b and/or 122b' may have similar components as the capture device 122a. For example, the implementation of the sensor 124a may be similar to the implementation of the sensors 124a', 124b and/or 124b'. In some embodiments, an arrangement of the components of the capture devices 122a, 122a', 122b and/or 122b' may have slight variations.

Scenes recorded by the camera 100 may be in the form of a signal (e.g., IM_A-IM_A' and IM_B-IM_B'). The signals IM_A-IM_A' and IM_B-IM_B' may represent light. The lenses 110a-110a' and 110b-110b' may capture and/or manipulate the light IM_A-IM_A' and IM_B-IM_B' from the surrounding environment. For example, the lenses 110a-110a' and 110b-110b' may manipulate the light IM_A-IM_A' and IM_B-IM_B' by focusing the light, magnifying the light (e.g., providing an optical zoom) and/or filtering the light (e.g., reducing glare, adding an artistic distortion effect, applying a color, etc.). The signals IM_A-IM_A' and IM_B-IM_B' may represent images of the environment surrounding the camera 100. The lenses 110a-110a' and 110b-110b' may present the signals IM_A-IM_A' and IM_B-IM_B' to the capture devices 122a, 122a', 122b and/or 122b'.

The circuit 124a, the circuit 126a and/or the circuit 128a may be subcomponents of the capture device 122a used to generate a signal (e.g., FRAMES_A) in response to the signal IM_A (e.g., the images that are captured). For example, the lens 110a may focus the signal IM_A on the sensor 124a. The sensor 124a may generate the signal FRAMES_A. The signal FRAMES_A may be raw image data. The signal FRAMES_A may be a number of frames generated in response to the signal IM_A over time. The signal FRAMES_A may be in an uncompressed (e.g., raw) format. The uncompressed format may be a Bayer format, a red/clear/clear/clear (RCCC) format, a red/green/blue/clear (RGBC) format, RGB format, YUV format, etc. Similarly, components of the capture devices 122a', 122b and/or 122b' may generate the signals FRAMES_A', FRAMES_B and FRAMES_B' in response to the signals IM_A', IM_B and IM_B', respectively. The capture devices 122a, 122a', 122b and/or 122b' may present the signals FRAMES_A-FRAMES_A' and FRAMES_B-FRAMES_B' to the circuit 120.

The circuit 120 may comprise a block (or circuit) 150*a*, a block (or circuit) 150*b* and/or a block (or circuit) 152. The circuits 150*a*-150*b* may be processors. The circuit 152 may be a communication block. Generally, the processor 150*a* may be a video processor associated with the capture devices 122*a*-122*a*' and the processor 150*b* may be a video processor associated with the capture devices 122*b*-122*b*'. For example, the capture device 122*a* may present the signal FRAMES_A to the processor 150*a*, the capture device 122*a*' may present the signal FRAMES_A' to the processor 150*a*, the capture device 122*b* may present the signal FRAMES_B to the processor 150*b* and the capture device 122*b*' may present the signal FRAMES_B' to the processor 150*b*.

Generally, each of the processors 150*a*-150*b* do not receive all of the raw image data signals FRAMES_A-FRAMES_A' and FRAMES_B-FRAMES_B' from all of the capture devices 122*a*, 122*a*', 122*b* and/or 122*b*'. Each of the processors 150*a*-150*b* may receive the raw image data from a subset of the capture devices 122*a*, 122*a*', 122*b* and/or 122*b*'. For example, one subset of the capture devices 122*a*, 122*a*', 122*b* and/or 122*b*' may comprise the capture device 122*a* and the capture device 122*a*' and another subset of the capture devices 122*a*, 122*a*', 122*b* and/or 122*b*' may comprise the capture device 122*b* and the capture device 122*b*'. The processor 150*a* may receive the video frames in the signal FRAMES_A and the signal FRAMES_A' from the subset comprising the capture devices 122*a*-122*a*' (e.g., the processor 150*a* does not receive video frames from the capture devices 122*b* and 122*b*'). The processor 150*b* may receive the video frames in the signal FRAMES_B and the signal FRAMES_B' from the subset comprising the capture devices 122*b*-122*b*' (e.g., the processor 150*b* does not receive video frames from the capture devices 122*a* and 122*a*').

In the embodiment shown in FIG. 5, each subset of the capture devices 122*a*, 122*a*', 122*b* and/or 122*b*' comprises two capture devices (e.g., the subset comprising the capture devices 122*a* and 122*a*' and the subset comprising the capture devices 122*b* and 122*b*'). Each subset of capture devices 122*a*, 122*a*', 122*b* and/or 122*b*' may present the corresponding raw video frames (FRAMES_A-FRAMES_A' and FRAMES_B-FRAMES_B') to an associated one of the processors 150*a*-150*b*. For example, the subset comprising the capture devices 122*a* and 122*a*' may be associated with the processor 150*a* and the subset comprising the capture devices 122*b* and 122*b*' may be associated with the processor 150*b*. In the example shown in FIG. 5, each of the subsets of capture devices 122*a*, 122*a*', 122*b* and/or 122*b*' comprise at least two distinct capture devices. For example, since the capture device 122*a* is part of the subset comprising the capture devices 122*a* and 122*a*', the capture device 122*a* is not part of any of the other subsets of capture devices (e.g., each of the capture devices 122*a*, 122*a*', 122*b* and/or 122*b*' presents the video frames in a respective one of the signals FRAMES_A-FRAMES_A' and FRAMES_B-FRAMES_B' to only one of the processors 150*a*-150*b*). The arrangement of the subsets of the capture devices 122*a*, 122*a*', 122*b* and/or 122*b*' and/or the associated processors 150*a*-150*b* may be varied according to the design criteria of a particular implementation.

The processors 150*a*-150*b* may be configured to process and/or encode the uncompressed video frames in the signals FRAMES_A-FRAMES_A' and FRAMES_B-FRAMES_B' to create video streams that are encoded versions of the signals FRAMES_A-FRAMES_A' and FRAMES_B-FRAMES_B'. The processors 150*a*-150*b* may be configured to generate signals (e.g., VIDEO_A-VIDEO_B) in response to the video frames FRAMES_A-FRAMES_A' and FRAMES_B-FRAMES_B'. Each of the processors 150*a*-150*b* may be configured to present one of the signals VIDEO_A-VIDEO_B to the communication block 152.

The processors 150*a*-150*b* may be configured to implement a TCP/IP stack. The TCP/IP stack may package the data packets from the encoded versions of the signals FRAMES_A-FRAMES_A' and FRAMES_B-FRAMES_B'. The TCP/IP stack may be configured to transfer the signals VIDEO_A-VIDEO_B to the communication block 152.

The communication block 152 may receive the signals VIDEO_A-VIDEO_B from the processors 150*a*-150*b*. The communication block 152 may be configured to generate a signal (e.g., STREAM) and receive a signal (e.g., POWER). The communication block 152 may package the signals VIDEO_A-VIDEO_B into a signal transmission (e.g., the signal STREAM). Generally, the signal STREAM and the signal POWER may be transmitted using a single cable 154. For example, the communication block 152 may comprise the interface 114 to connect with the single cable 154. The signal STREAM may be transmitted to an external device and/or a network.

The signal STREAM may be presented in real-time (or near real-time). Presenting the signal STREAM in real-time may comprise processing and/or synchronizing the input captured by the capture devices 122*a*, 122*a*', 122*b* and/or 122*b*' without local storage in the camera 100. For example, the camera 100 may not need to have independent storage. The synchronization of the data associated with the signal STREAM may ensure that local storage in the camera 100 is not needed. The signal STREAM may be generated before all recording is done (e.g., without storing a copy of data in the signals VIDEO_A-VIDEO_B). By providing the signal STREAM in real-time, the spherical field of view may be generated and viewed as a live video feed.

Implementation of the sensor 124*a* may be representative of the implementation of the sensors 124*a*, 124*a*', 124*b* and/or 124*b*'. The sensor 124*a* may receive light in the signal IM_A from the lens 110*a*. The sensor 124*a* may be configured to convert light to pixel data (e.g., image data). For example, the sensor 124*a* may be implemented as an array (e.g., a photosensor with a color filter array) configured to detect an intensity and/or color of incoming light in the signal IM_A. The pixel data from the sensor 124*a* may be retrieved by the logic 126*a*.

Implementation of the logic 126*a* may be representative of the implementation of the logic 126*a*, 126*a*', 126*b* and/or 126*b*'. The logic 126*a* may be configured to retrieve the pixel data from the sensor 124*a*. The logic 126*a* may convert the pixel data from the sensor 124*a* to a particular protocol. For example, the logic 126*a* may convert the pixel data to a raw data format (e.g., a Bayer format, a RCCC format, etc.). In some embodiments, the pixel data may be in a RGB or YUV format. The protocol implemented by the logic 126*a* may be varied according to the design criteria of a particular implementation. In some embodiments, the logic 126*a* may be implemented as a shift register, a serializer, logic gates and/or other components. The logic 126*a* may generate the signal FRAMES_A in response to the pixel data retrieved from the sensor 124*a*.

In some embodiments, the logic 126*a* may be configured to pack pixel data from the sensor 124*a*. For example, the pixel data from the sensor 124*a* may be in a 20-bit format. The logic 126*a* may pack the pixel data in a 12-bit format. In some embodiments, the logic 126*a* may be used to control a gain value for output from the sensor 124*a*. In some embodiments, the logic 126*a* may be configured to perform high dynamic range (HDR) processing prior to transmitting the FRAMES_A-FRAMES_A' and/or FRAMES_B-FRAMES_B'. In some embodiments, the logic 126a may be used to transmit brightness/color values (e.g., represented by values from 0-255). The capture device 122a and the processor 150a may be connected using an I²C bus. Other types of connection protocols may be implemented. The implementation of the logic 126a may be varied according to the design criteria of a particular implementation.

In some embodiments, the logic 126a may be part of the sensor 124a. In one example, the capture device 122a may comprise only the sensor 122a and the logic 126a may be embedded in the sensor 122a (e.g., the sensor 122a and the logic 126a are implemented as one component). The capture device 122a may further be connected to the processor 150a (e.g., over a serial or parallel interface, such as an I²C bus).

Implementation of the buffer 128a may be representative of the implementation of the buffers 128a, 128a', 128b and/or 128b'. The buffer 128a may be a frame buffer. The buffer 128a may provide temporary storage of the pixel data from the sensor 126a. The temporary storage of the pixel data by the buffer 128a may provide more time for the logic 126a to convert the pixel data to the signal FRAMES_A. For example, as the resolution of the image captured by the sensor 124a increases, the logic 126a may need more time to generate the signal FRAMES_A. The buffer 128a allows the logic 126a to have access to previously captured pixel data while the sensor 124a captures more new images from the signal IM_A.

The capture devices 122a, 122a', 122b and/or 122b' shown in FIG. 5 may represent one example implementation. The capture devices 122a, 122a', 122b and/or 122b' shown in FIG. 5 may represent some of the components that may be implemented. In some embodiments, the capture devices 122a, 122a', 122b and/or 122b' may be pre-fabricated assembly components purchased from a manufacturer (e.g., a drop-in component). Generally, the camera 100 may operate with various types of capture devices 122a, 122a', 122b and/or 122b' to generate images. For example, the circuit 120 may be configured to receive particular signals (e.g., FRAMES_A-FRAMES_A' and/or FRAMES_B-FRAMES_B') from the capture devices 122a, 122a', 122b and/or 122b' and the internal components of the capture devices 122a, 122a', 122b and/or 122b' used to generate the signals FRAMES_A-FRAMES_A' and/or FRAMES_B-FRAMES_B' may not have an impact on the operation of the camera 100. The implementation of the capture devices 122a, 122a', 122b and/or 122b' may be varied according to the design criteria of a particular implementation.

Figure 6:
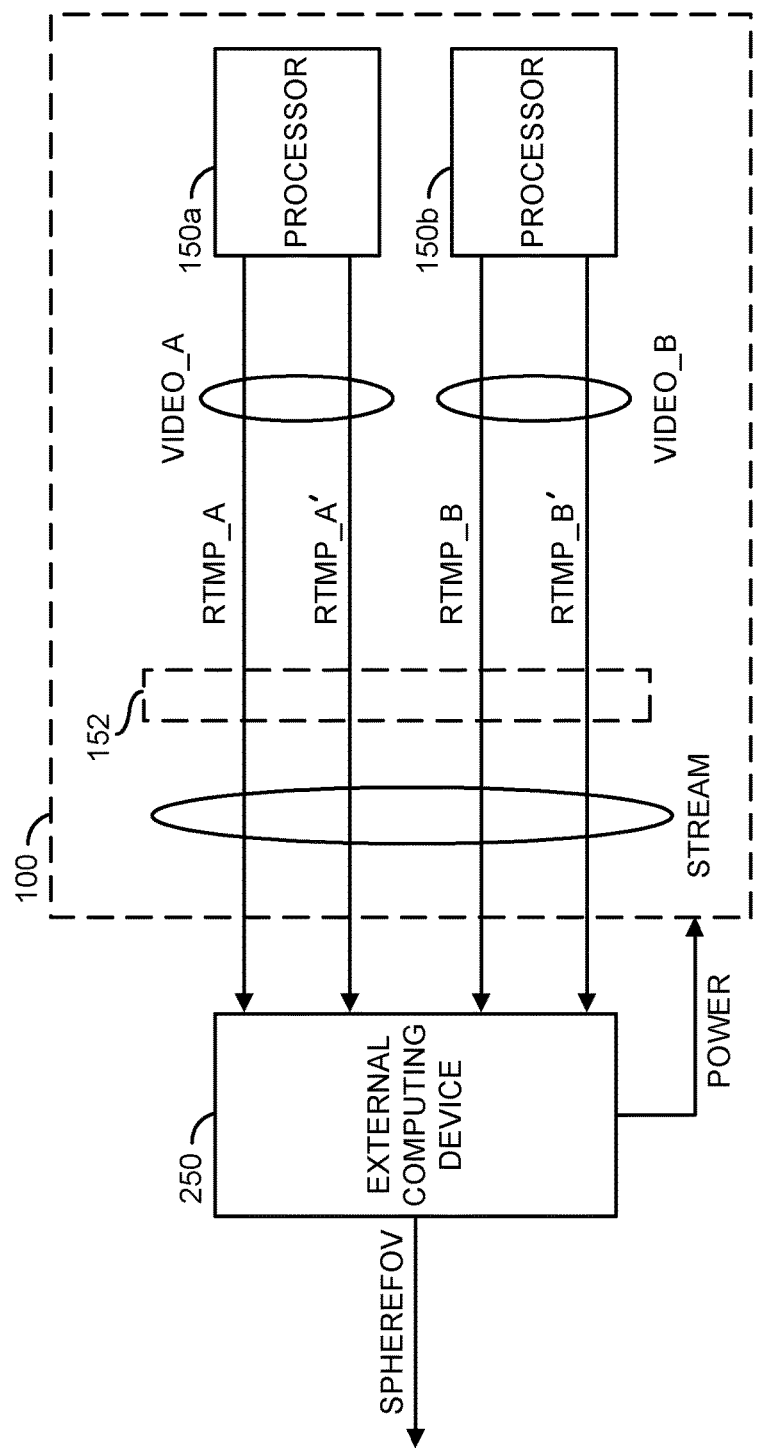
FIG. 6 is a diagram illustrating the first and second processors transmitting video streams to an external computing device.

Referring to FIG. 6, a diagram illustrating the first and second processors 150a-150b transmitting video streams to the external computing device 250 is shown. The processors 150a-150b may be configured to encode the video frames in the signals FRAMES_A-FRAMES_A' and FRAMES_B-FRAMES_B'. In one example, each of the raw frames in the signals FRAMES_A-FRAMES_A' and FRAMES_B-FRAMES_B' may be converted to YUV frames and compressed into a video format by one of the corresponding processors 150a-150b. For example, a video format may be an encoded and/or compressed version of the frames in the signals FRAMES_A-FRAMES_A' and FRAMES_B-FRAMES_B' (e.g., a format such as H.264, H.265, VP9, etc.). The implementation of the encoding performed by the processors 150a-150b may be varied according to the design criteria of a particular implementation. The processors 150a-150b may present signals (e.g., RTMP_A-RTMP_A' and RTMP_B-RTMP_B') to the communication block 152 in response to the signals FRAMES_A-FRAMES_A' and FRAMES_B-FRAMES_B' received from the capture devices 122a, 122a', 122b and 122b'.

The signals RTMP_A-RTMP_A' and RTMP_B-RTMP_B' may be encoded versions of the signals FRAMES_A-FRAMES_A' and FRAMES_B-FRAMES_B'. The signals RTMP_A-RTMP_A' and RTMP_B-RTMP_B' may generally comprise encoded video data. In some embodiments, one or more of the signals RTMP_A-RTMP_A' and RTMP_B-RTMP_B' may further comprise additional data. For example, the signal RTMP_A may carry encoded video data (e.g., in the H.264 format) along with audio data (e.g., in an AAC format) and metadata (e.g., location and/or movement information), the signal RTMP_A' may carry encoded video data (e.g., in the H.264 format), the signal RTMP_B may carry encoded video data (e.g., in the H.264 format) along with audio data (e.g., in the AAC format), and the signal RTMP_B' may carry encoded video data (e.g., in the H.264 format). The audio data carried by one of the video streams (e.g., the AAC data in the signal RTMP_A) may be data associated with the video data in the other video stream (e.g., RTMP_A') in the same video stream subset (e.g., the subset of video streams carried by the signal VIDEO_A). The data carried in each of the video streams RTMP_A-RTMP_A' and RTMP_B-RTMP_B' may be varied according to the design criteria of a particular implementation.

Each of the signals VIDEO_A-VIDEO_B may comprise a subset of the plurality of the video streams RTMP_A-RTMP_A' and RTMP_B-RTMP_B'. In the example shown, the signal VIDEO_A may comprise two video streams (e.g., the encoded video streams RTMP_A-RTMP_A') generated by the processor 150a. One of the encoded video streams (e.g., RTMP_A) in the signal VIDEO_A may be generated in response to the processor 150a processing the video frames FRAMES_A (e.g., received from the capture device 122a) and another of the encoded video streams (e.g., RTMP_A') in the signal VIDEO_A may be generated in response to the processor 150a processing the video frames FRAMES_A' (e.g., received from the capture device 122a'). In the example shown, the signal VIDEO_B may comprise two video streams (e.g., the encoded video streams RTMP_B-RTMP_B') generated by the processor 150b. One of the video streams (e.g., RTMP_B) in the signal VIDEO_B may be generated in response to the processor 150b processing the video frames FRAMES_B (e.g., received from the capture device 122b) and another of the video streams (e.g., RTMP_B') in the signal VIDEO_B may be generated in response to the processor 150b processing the video frames FRAMES_B' (e.g., received from the capture device 122b').

The processors 150a-150b may present the signals VIDEO_A-VIDEO_B to the communication block 152. The signals VIDEO_A-VIDEO_B may comprise the data packets of the video streams RTMP_A-RTMP_A' and RTMP_B-RTMP_B'. The communication block 152 may be configured to send/receive data and/or to receive power (e.g., to provide all components of the camera 100 with power). The communication block 152 may receive the encoded video streams RTMP_A-RTMP_A' and RTMP_B-RTMP_B' in the signals VIDEO_A-VIDEO_B from the processors 150a-150b and transmit (e.g., forward) the encoded video streams RTMP_A-RTMP_A' and RTMP_B-RTMP_B' to an external device 250 as a signal (e.g., STREAM). For example, the signal STREAM may be a single transmission of the encoded video streams RTMP_A-RTMP_A' and RTMP_B-RTMP_B'. In the example shown, the processors 150a-150b may generate data packets for the video streams RTMP_A-RTMP_A' and RTMP_B-RTMP_B' (e.g., a TCP/IP stack implemented by the processors 150a-150b). The communication block 152 may receive two video streams (e.g., RTMP_A-RTMP_A') from the signal VIDEO_A and two video streams (e.g., RTMP_B-RTMP_B') from the signal VIDEO_B and forward the four encoded video streams RTMP_A-RTMP_A' and RTMP_B-RTMP_B' as the signal STREAM (e.g., on a first in first out basis). In an example implementation, the communication block 152 may not analyze contents of the data packets in the signals VIDEO_A-VIDEO_B (e.g., the communication block 152 may implement a conventional hub). The signal STREAM may transmit the video streams RTMP_A-RTMP_A' and RTMP_B-RTMP_B' on a first in first out basis. The communication block 152 may be further configured to receive the signal POWER from an external power source such as the external computing device 250. The signal POWER may provide power to the camera 100. For example, the camera 100 may not need to have an independent source of power.

The data associated with the encoded video streams RTMP_A-RTMP_A' and RTMP_B-RTMP_B' in the signal STREAM may be synchronized to allow real-time (or near real-time) streaming of the spherical field of view of the scene surrounding the camera 100. The data associated with the encoded video streams RTMP_A-RTMP_A' and RTMP_B-RTMP_B' in the signal STREAM may allow the external computing device 250 to perform video stitching operations to transform the encoded video streams RTMP_A-RTMP_A' and RTMP_B-RTMP_B' into the spherical field of view. For example, the video stitching operations performed by the external computing device 250 may be used to transform the four video streams RTMP_A-RTMP_A' and RTMP_B-RTMP_B' into a single video file (e.g., SPHEREFOV) representing the spherical field of view.

A projection method may be implemented to represent a spherical (or panoramic) view as a flat image. Examples of projection methods include cylindrical projections (e.g., Mercator, Miller, Equirectangular, Lambert cylindrical equal area, etc.), azimuthal projections (e.g., Rectilinear, Stereographic, Fisheye, Equisolid, Orthographic, etc.) or other projections (e.g., Cubic, Sinusoidal, Transverse mercator, Pannini, Architectural, etc.). The particular projection method implemented (e.g., Equirectangular) may be varied. Certain projection methods (e.g., Cubic projection) may offer benefits when implementing video coding. The transformation of the four encoded video streams RTMP_A-RTMP_A' and RTMP_B-RTMP_B' into the single file SPHEREFOV may comprise a manipulation of the encoded video streams RTMP_A-RTMP_A' and RTMP_B-RTMP_B' (e.g., dewarping, cropping, shifting, etc.). The spherical field of view may allow the single video file SPHEREFOV to present an omnidirectional 2D image. In some embodiments, the spherical field of view generated in response to the video streams RTMP_A-RTMP_A' and RTMP_B-RTMP_B' may be combined with another video file providing another spherical field of view to allow a viewer to experience a three dimensional reality (e.g., the video file SPHEREFOV and another video file may provide a left and right view of the surrounding environment to create depth perception). In some embodiments, the signal file SPHEREFOV may be a monoscopic view. In some embodiments, the signal file SPHEREFOV may be a stereoscopic view (e.g. one view for each eye). A stereoscopic view may be stored as the single video file SPHEREFOV, generally representing a single scene.

The lenses 110a-110a' and 110b-110b' may be arranged such that overlapping areas of the surrounding environment are captured by the capture devices 122a, 122a', 122b and/or 122b'. The synchronization of the encoded video streams RTMP_A-RTMP_A' and RTMP_B-RTMP_B' by the camera 100 may be implemented to ensure that the overlapping areas captured represent the same scene at the same time to allow for a successful video stitching operation to be performed by the external computing device 250. Since multiple processors 150a-150b perform processing and the data signal STREAM is sent over the communication block 152, randomness and/or latency may be present in the transmission of the data packets. An impact of randomness and/or latency may be minimized by the synchronization.

In some embodiments, the data packets associated with the video streams RTMP_A-RTMP_A' and RTMP_B-RTMP_B' may be synchronized (e.g., ordered) by the camera 100. In one example, an exposure timing of the capture devices 122a, 122a', 122b and/or 122b' may be synchronized. In another example, the transmission of the multiple encoded video streams RTMP_A-RTMP_A' and RTMP_B-RTMP_B' may be configured to ensure that the video frames in the signals FRAMES_A-FRAMES_A' and FRAMES_B-FRAMES_B' from the various encoded video streams RTMP_A-RTMP_A' and RTMP_B-RTMP_B' in the signal STREAM are interleaved.

In some embodiments, the data packets may be synchronized (e.g., ordered) by the external computing device 250. In some embodiments, the data packets may be synchronized (e.g., ordered) by both the camera 100 and the external computing device 250. The implementation of the synchronization of the data packets of the encoded video streams RTMP_A-RTMP_A' and RTMP_B-RTMP_B' may be varied according to the design criteria of a particular implementation.

The external computing device 250 may be configured to perform video stitching operations and present the spherical field of view SPHEREFOV. The external computing device 250 may implement a power source to generate the signal POWER for the camera 100. In some embodiments, the external computing device 250 may be implemented as a miniature portable computer. In some embodiments, the external computing device 250 may be a micro computer (e.g., a microPC). In some embodiments, the external computing device 250 may be a desktop computer (or laptop computer, or notebook computer). In some embodiments, the external computing device 250 may be a tablet computing device. In some embodiments, the external computing device 250 may be a smartphone. In some embodiments, the external computing device 250 may be implemented as a head mounted display (e.g., smart glasses, a virtual reality headset, etc.). In some embodiments, the external computing device 250 may be a holographic computer. In some embodiments, the external computing device 250 may be a cloud of computers. The implementation of the external computing device 250 may be varied according to the design criteria of a particular implementation.

The external computing device 250 may be configured to decode the multiple video streams RTMP_A-RTMP_A' and RTMP_B-RTMP_B' that arrive in the signal STREAM, then perform stitching operations to generate a single video stream comprised of the video streams RTMP_A-RTMP_A' and RTMP_B-RTMP_B'. The external computing device 250 may be configured to re-encode the single video stream to generate the signal SPHEREFOV.

In some embodiments, the video streams RTMP_A-RTMP_A' and RTMP_B-RTMP_B' may each be 4K streams.

However, the particular resolution implemented may be varied according to the design criteria of a particular implementation. The combined signal STREAM may comprise approximately 8K of video data (e.g., 4K from each of the four video streams RTMP_A-RTMP_A' and RTMP_B-RTMP_B'). The stitching operations performed by the external computing device 250 may transform the signal STREAM into a stream with approximately 6K to 8K of video data representing the spherical field of view. In an example implementation, the stitching may reduce overlapping portions of the 8K total video data down to a resolution of between 6K and 8K. In another example, the camera 100 may capture 4 video streams of approximately 3 megapixels (e.g., 2K) of video data and the stitched spherical video may be approximately 8 megapixels (e.g., 4K) of video data.

The signal STREAM may transmit the video streams RTMP_A-RTMP_A' and RTMP_B-RTMP_B' in real-time (or near real-time). Generally, the video streams RTMP_A-RTMP_A' and RTMP_B-RTMP_B' are not stored by the camera 100. For example, the camera 100 does not encode and store a complete copy of the video streams RTMP_A-RTMP_A' and RTMP_B-RTMP_B' before packaging the video streams RTMP_A-RTMP_A' and RTMP_B-RTMP_B' as the signal STREAM for transmission. The data packets of the video streams RTMP_A-RTMP_A' and RTMP_B-RTMP_B' may be transmitted on a first in first out basis (e.g., in real-time).

Figure 7:
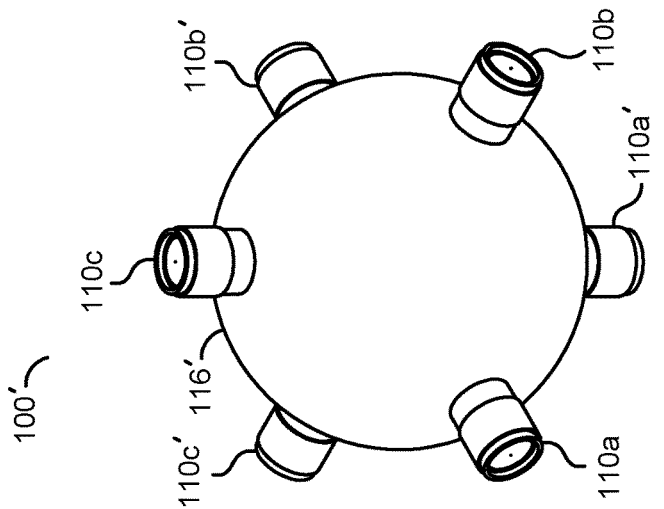
FIG. 7 is a diagram illustrating an isometric view of an example 6-lens embodiment of an omnidirectional camera.

Referring to FIG. 7, a diagram illustrating an isometric view of an example 6-lens embodiment of an omnidirectional camera 100' is shown. The 6-lens omnidirectional camera 100' may comprise the frame/casing 116', the neck 112' and/or three subsets of the lenses 110a-110c and 110a'-110c'. Each of the three subsets of the lenses 110a-110c and 110a'-110c' may comprise two of the lenses 110a-110c and 110a'-110c'. For example, one of the subsets of the lenses 110a-110c and 110a'-110c' may be a subset comprising the lenses 110a and 110a'. In another example, one of the subsets of the lenses 110a-110c and 110a'-110c' may be a subset comprising the lenses 110b and 110b'. In yet another example, one of the subsets of the lenses 110a-110c and 110a'-110c' may be a subset comprising the lenses 110c and 110c'.

Each of the three subsets of the lenses 110a-110c and 110a'-110c' may comprise two distinct lenses (e.g., each of the lenses 110a-110c and 110a'-110c' only belong to one of the subsets of the lenses 110a-110c and 110a'-110c'). Which of the lenses 110a-110c and 110a'-110c' belong to which subset of the lenses 110a-110c and 110a'-110c' may vary according to the design criteria of a particular implementation. For example, a location, direction of aim and/or a proximity to other lenses 110a-110c and 110a'-110c' may be irrelevant to which of the lenses 110a-110c and 110a'-110c' are in which subset of the lenses 110a-110c and 110a'-110c'. Each of the lenses 110a-110c and 110a'-110c' may be associated with a capture device (e.g., the capture devices 122a-122c and 122a'-122c').

Figure 8:
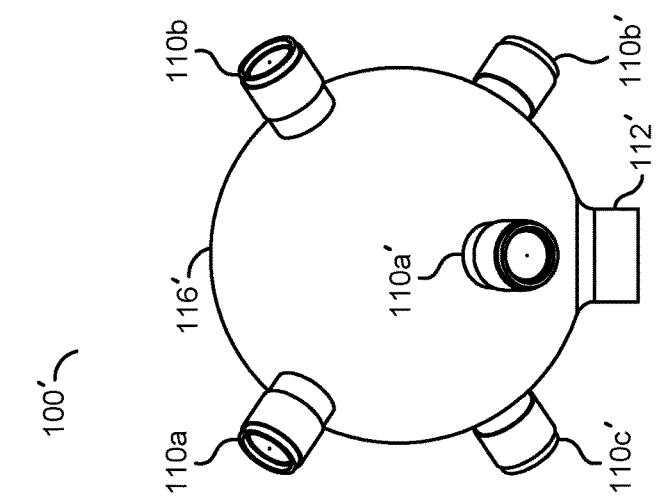
FIG. 8 is a diagram illustrating a side view of an example 6-lens embodiment of an omnidirectional camera.

Referring to FIG. 8, a diagram illustrating a side view of an example 6-lens embodiment of an omnidirectional camera 100' is shown. The side view shows that the lenses 110a-110c and 110a'-110c' are arranged to allow images captured by the associated capture devices 122a-122c and 122a'-122c' to provide coverage for a spherical field of view of a scene surrounding the omnidirectional camera 100'.

Figure 9:
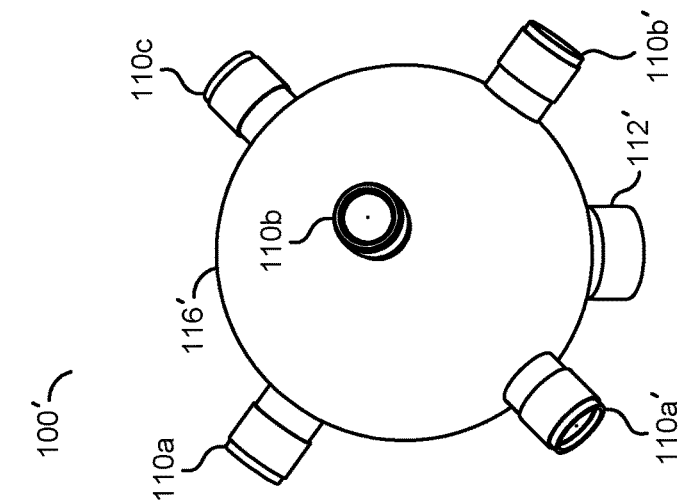
FIG. 9 is a diagram illustrating a top view of an example 6-lens embodiment of an omnidirectional camera.

Referring to FIG. 9, a diagram illustrating a top view of an example 6-lens embodiment of an omnidirectional camera 100' is shown. The top view shows that the lenses 110a-110c and 110a'-110c' are arranged to allow images captured by the associated capture devices 122a-122c and 122a'-122c' to provide coverage for a spherical field of view of a scene surrounding the omnidirectional camera 100'.

Referring to FIG. 10, a diagram illustrating an isometric view of an example 8-lens embodiment of an omnidirectional camera 100" is shown. The 8-lens omnidirectional camera 100" may comprise the frame/casing 116", the neck 112" and/or four subsets of the lenses 110a-110d and 110a'-110d'. Each of the four subsets of the lenses 110a-110d and 110a'-110d' may comprise two of the lenses 110a-110d and 110a'-110d'. For example, one of the subsets of the lenses 110a-110d and 110a'-110d' may be a subset comprising the lenses 110a and 110a'. In another example, one of the subsets of the lenses 110a-110d and 110a'-110d' may be a subset comprising the lenses 110b and 110b'. In yet another example, one of the subsets of the lenses 110a-110d and 110a'-110d' may be a subset comprising the lenses 110c and 110c'. In still another example, one of the subsets of the lenses 110a-110d and 110a'-110d' may be a subset comprising the lenses 110d and 110d'.

Each of the four subsets of the lenses 110a-110d and 110a'-110d' may comprise two distinct lenses (e.g., each of the lenses 110a-110d and 110a'-110d' only belong to one of the subsets of the lenses 110a-110d and 110a'-110d'). Which of the lenses 110a-110d and 110a'-110d' belong to which subset of the lenses 110a-110d and 110a'-110d' may vary according to the design criteria of a particular implementation. For example, a location, direction of aim and/or a proximity to other lenses 110a-110d and 110a'-110d' may be irrelevant to which of the lenses 110a-110d and 110a'-110d' are in which subset of the lenses 110a-110d and 110a'-110d'. Each of the lenses 110a-110d and 110a'-110d' may be associated with a capture device (e.g., the capture devices 122a-122d and 122a'-122d').

Referring to FIG. 11, a diagram illustrating a side view of an example 8-lens embodiment of an omnidirectional camera 100" is shown. The side view shows that the lenses 110a-110d and 110a'-110d' are arranged to allow images captured by the associated capture devices 122a-122d and 122a'-122d' to provide coverage for a spherical field of view of a scene surrounding the omnidirectional camera 100".

Referring to FIG. 12, a diagram illustrating a top view of an example 8-lens embodiment of an omnidirectional camera 100" is shown. The top view shows that the lenses 110a-110d and 110a'-110d' are arranged to allow images captured by the associated capture devices 122a-122d and 122a'-122d' to provide coverage for a spherical field of view of a scene surrounding the omnidirectional camera 100".

The 8-lens embodiment of an omnidirectional camera 100" has more lenses than the 6-lens embodiment of an omnidirectional camera 100'. For example, increasing the number of the lenses 110a-110d and 110a'-110d' may allow a higher resolution and/or higher pixel density in the signal SPHEREFOV. In another example, increasing the number of the lenses 110a-110d and 110a'-110d' may reduce parallax between the lenses 110a-110d and 110a'-110d'. In yet another example, increasing the number of the lenses 110a-110d and 110a'-110d' may allow creation of a 3D video signal SPHEREFOV (e.g., if each point surrounding the omnidirectional camera 100" is captured by more than one of the lenses 110a-110d and 110a'-110d' there may be enough information to generate a depth map). In still another example, increasing the number of the lenses 110a-110d and 110a'-110d' may increase an amount of processing needed and/or increase an amount of data generated.

Figure 13:
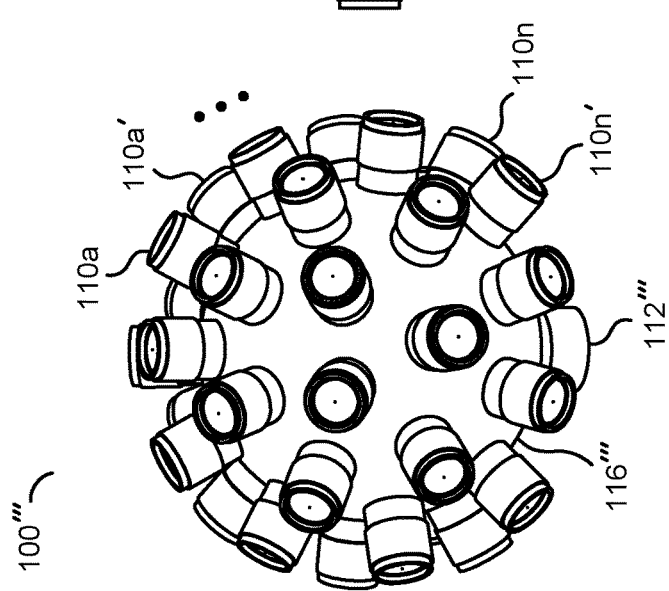
FIG. 13 is a diagram illustrating an isometric view of an example multi-lens embodiment of an omnidirectional camera.

Referring to FIG. 13, a diagram illustrating an isometric view of an example multi-lens embodiment of an omnidirectional camera 100''' is shown. The multi-lens omnidirectional camera 100''' may comprise the frame/casing 116''', the neck 112''' and/or multiple subsets of the lenses 110a-110n and 110a'-110n'. Each of the multiple subsets of the lenses 110a-110n and 110a'-110n' may comprise at least two of the lenses 110a-110n and 110a'-110n'. For example, one of the subsets of the lenses 110a-110n and 110a'-110n' may be a subset comprising the lenses 110a and 110a'. In another example, one of the subsets of the lenses 110a-110n and 110a'-110n' may be a subset comprising the lenses 110n and 110n'.

Each of the multiple subsets of the lenses 110a-110n and 110a'-110n' may comprise at least two distinct lenses (e.g., each of the lenses 110a-110n and 110a'-110n' only belong to one of the subsets of the lenses 110a-110n and 110a'-110n'). Which of the lenses 110a-110n and 110a'-110n' belong to which subset of the lenses 110a-110n and 110a'-110n' may vary according to the design criteria of a particular implementation. For example, a location, direction of aim and/or a proximity to other lenses 110a-110n and 110a'-110n' may be irrelevant to which of the lenses 110a-110n and 110a'-110n' are in which subset of the lenses 110a-110n and 110a'-110n'. Each of the lenses 110a-110n and 110a'-110n' may be associated with a capture device (e.g., the capture devices 122a-122n and 122a'-122n').

Figure 14:
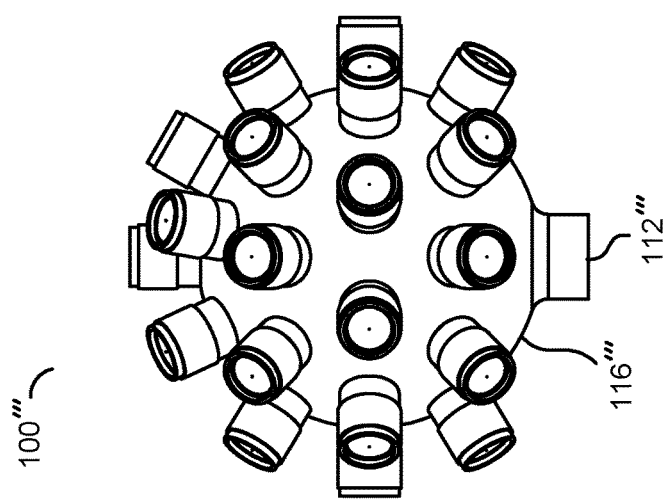
FIG. 14 is a diagram illustrating a side view of an example multi-lens embodiment of an omnidirectional camera.

Referring to FIG. 14, a diagram illustrating a side view of an example multi-lens embodiment of an omnidirectional camera 100''' is shown. The side view shows that the lenses 110a-110n and 110a'-110n' are arranged to allow images captured by the associated capture devices 122a-122n and 122a'-122n' to provide coverage for a spherical field of view of a scene surrounding the omnidirectional camera 100'''.

Figure 15:
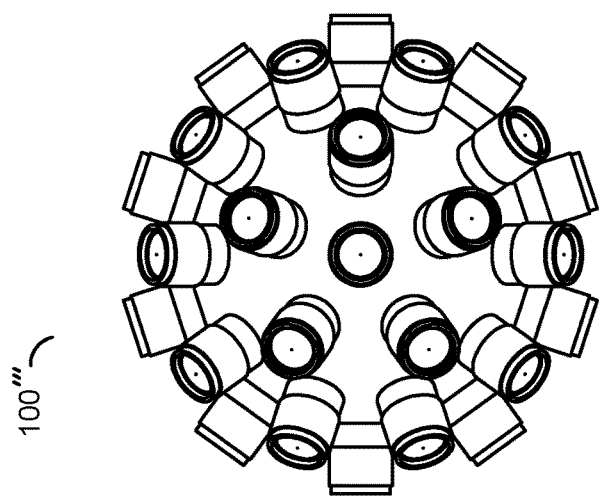
FIG. 15 is a diagram illustrating a top view of an example multi-lens embodiment of an omnidirectional camera.

Referring to FIG. 15, a diagram illustrating a top view of an example multi-lens embodiment of an omnidirectional camera 100''' is shown. The top view shows that the lenses 110a-110n and 110a'-110n' are arranged to allow images captured by the associated capture devices 122a-122n and 122a'-122n' to provide coverage for a spherical field of view of a scene surrounding the omnidirectional camera 100'''.

Associating at least two capture devices (e.g., 122a-122a') for each processor (e.g., the processor 150a) may allow the number of lenses 110a-110n and 110a'-110n' to be scaled up or down while still allowing the omnidirectional camera 100''' to be able to provide a real-time of the spherical field of view.

In some embodiments of the omnidirectional camera 100''', more than two lenses may be in a subset of the lenses. For example, one subset of the lenses may comprise the lenses 110a, 110a', 110a'', 110a''', 110a$^{(4)}$', ..., 110a$^{(n)}$'. In another example, one subset of the lenses may comprise the lenses 110n, 110n', 110n'', 110n''', 110n$^{(4)}$', ..., 110n$^{(n)}$'. For an example of components associated with the processor 150a, each of the lenses 110a, 110a', 110a'', 110a''', 110a$^{(4)}$', ..., 110a$^{(n)}$' may be associated with the capture devices 122a, 122a', 122a'', 122a''', 122a$^{(4)}$', ..., 122a$^{(n)}$'. Each of the capture devices 122a, 122a', 122a'', 122a''', 122a$^{(4)}$', ..., 122a$^{(n)}$' may be associated with the processor 150a. Based on data captured by the capture devices 122a, 122a', 122a'', 122a''', 122a$^{(4)}$', ..., 122a$^{(n)}$', the processor 150a may generate the video streams RTMP_A, RTMP_A', RTMP_A'', RTMP_A''', RTMP_A$^{(4)}$', ..., RTMP_A$^{(n)}$'. Similarly, the processor 150b may generate the video streams RTMP_B, RTMP_B', RTMP_B'', RTMP_B''', RTMP_B$^{(4)}$', ..., RTMP_B$^{(n)}$' and the processor 150n may generate the video streams RTMP_N, RTMP_N', RTMP_N'', RTMP_N''', RTMP_N$^{(4)}$', ..., RTMP_N$^{(n)}$'. For simplicity, the notation RTMP_A-RTMP_A', ..., RTMP_N-RTMP_N' may refer to the video streams RTMP_A, RTMP_A', RTMP_A'', RTMP_A''', RTMP_A$^{(4)}$', ..., RTMP_A$^{(n)}$', RTMP_B, RTMP_B', RTMP_B'', RTMP_B''', RTMP_B$^{(4)}$', ..., RTMP_B$^{(n)}$', etc. (e.g., many of the processors 150a-150n generating many video streams). A similar notation may be used when referring to other components (e.g., the sensors 124a-124a', ..., 124n-124n' may refer to many sensors 124a, 124a', 124a'', ..., 124a$^{(n)}$', 124b, 124b', 124b'', ..., 125a$^{(n)}$', etc. associated with each of the processors 150a-150n).

Figure 16:
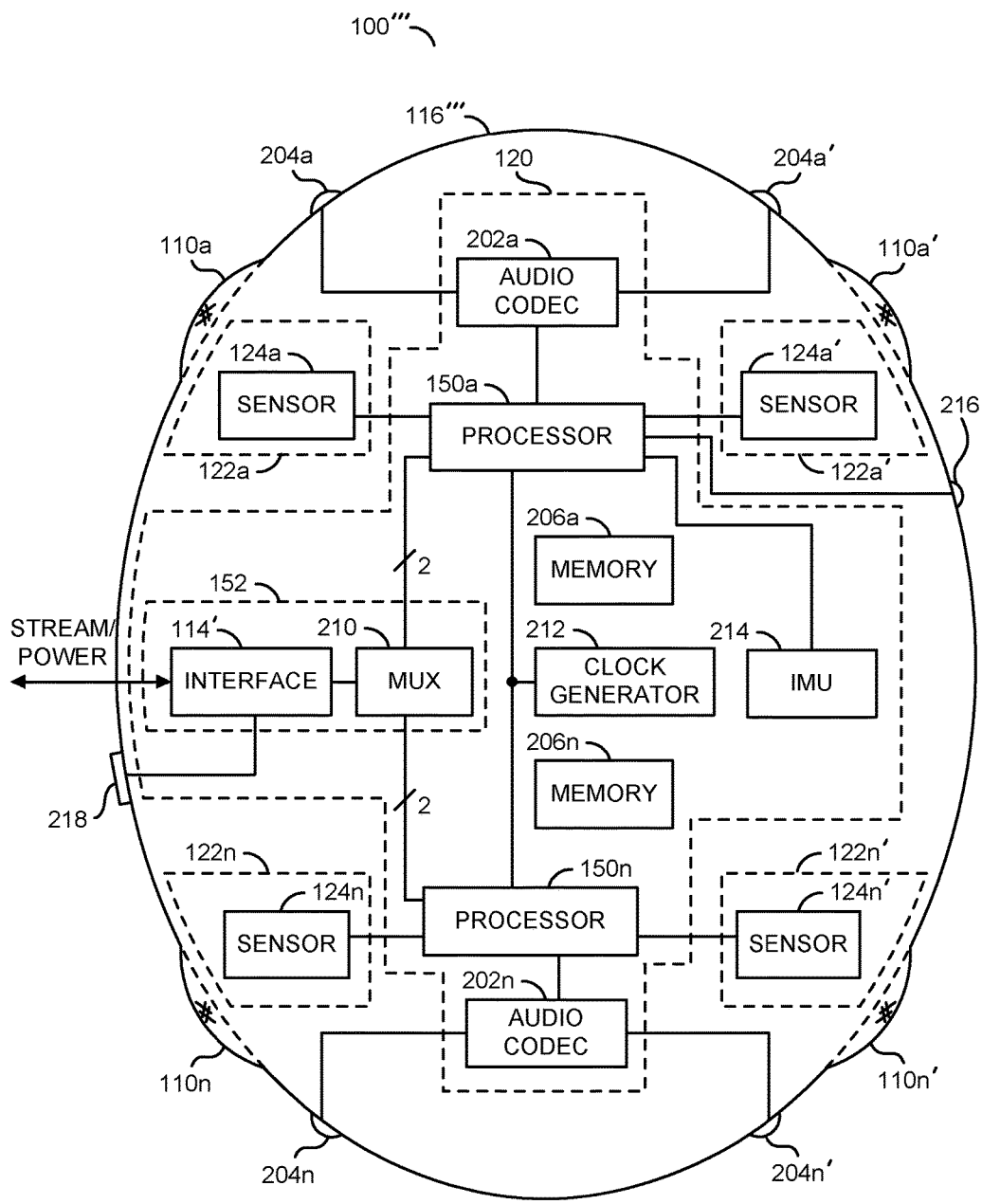
FIG. 16 is a diagram illustrating example internal components of an example embodiment of an omnidirectional camera.

Referring to FIG. 16, a diagram illustrating example internal components of an example embodiment of the omnidirectional camera 100''' is shown. A portion of the frame/casing 116''' is shown comprising the lenses 110a-110a' and the lenses 110n-110n'. Internal components of the omnidirectional camera 100''' are shown. The internal components comprise the capture device 122a (e.g., associated with the lens 110a), the capture device 122a' (e.g., associated with the lens 110a'), the capture device 122n (e.g., associated with the lens 110n), the capture device 122n' (e.g., associated with the lens 110n'), and the circuit 120.

The circuit 120 may comprise the processors 150a-150n, blocks (or circuits) 202a-202n and/or blocks (or circuits) 206a-206n. The circuits 202a-202n may implement an audio codec block. The circuits 206a-206n may comprise a memory. Generally, each of the audio codec blocks 202a-202n and the memory blocks 206a-206n are associated with one of the processors 150a-150n. For example, the capture device 122a, the capture device 122a', the audio codec block 202a and/or the memory 206a may be associated with the processor 150a.

Similarly, the circuit 120 may comprise the communication block 152, a block (or circuit) 212 and/or a block (or circuit) 214. The circuit 212 may implement a clock generator. The circuit 214 may implement an inertial measurement unit. Other components may be implemented. The number, type and/or arrangement of the components in the omnidirectional camera 100''' may be varied according to the design criteria of a particular implementation.

Implementation of the audio codec block 202a may be representative of the implementation of the audio codec blocks 202a, 202a', ..., 202n, and/or 202n' (e.g., all of the audio codec blocks 202 implemented in the omnidirectional camera 100'''). The audio codec block 202a may be implemented to capture audio data from the environment surrounding the omnidirectional camera 100'''. The omnidirectional camera 100''' may comprise microphones (e.g., microphones 204a-204a' and 204n-204n' are shown). The microphones 204a-204a' may be representative of the microphones 204a, 204a', ..., 204n, 204n' (e.g., all of the microphones 204 of the omnidirectional camera 100'''). The microphones 204a-204a' may be configured to receive audio signals from the environment surrounding the omnidirectional camera 100'''. The audio codec block 202a may receive audio input from the microphones 204a-204a'. For example, the microphone 204a may be located to capture audio from a direction associated with the lens 110a and the microphone 204a' may be located to capture audio from a direction associated with the lens 110a'. Since the capture devices 122a and 122a' and the audio codec block 202a are associated with the processor 150a, the audio data captured by the microphones 204a and 204a' may correspond to the images captured by the capture devices 122a and 122a'. The arrangement of the microphones 204a and 204a' may be varied according to the design criteria of a particular implementation.

The audio codec block 202a may compress and/or process the audio data captured from the environment by the microphones 204a and 204a'. The implementation of the audio codec block 204a may be varied according to the design criteria of a particular implementation. In some embodiments, the audio codec block 202a may include an analog-to-digital converter (ADC) (e.g., when the microphones 204a and/or 204a' are implemented as analog devices). In some embodiments, the audio codec block 202a may not perform analog-to-digital operations (e.g., when the microphones 204a and/or 204a' are implemented as digital devices). Generally, the audio codec block 202a may implement some basic logic (e.g., high-pass and/or low-pass filtering, digital signal processing, etc.). In some embodiments, the audio codec block 202a may encode the received audio into a particular format (e.g., MP3, AAC, FLAC, etc.). For example, the audio codec block 202a may present the encoded audio to the processor 150a. In some embodiments, output from the audio codec block 202a may be pulse-code modulation (PCM) and/or in other uncompressed digital audio formats. The output may be presented to the associated processor 150a over an I$^2$S bus. For example, the associated processor 150a may perform encoding and/or compression of audio data.

Implementation of the memory 206a may be representative of the implementation of the memory blocks 206a, 206a', . . . , 206n, and/or 206n' (e.g., all of the memory blocks 206 implemented in the omnidirectional camera 100'''). The memory 206a may provide non-volatile storage of data for the processor 150a. In some embodiments, the memory 206a may be a cache memory. In some embodiments, the memory 206a may be a buffer for images captured by the capture devices 122a and 122a'. For example, the processor 150a may be configured to encode the video streams RTMP_A-RTMP_A' based on the signals FRAMES_A-FRAMES_A' received from the capture devices 122a and 122a' on the fly. The memory 206a may allow temporary storage of the signals FRAMES_A-FRAMES_A' to provide the processor 150a with more time to perform encoding operations used to generate the video streams RTMP_A-RTMP_A' while new images are captured by the capture devices 122a and 122a'. Generally, the memory 206a does not store the encoded video streams RTMP_A-RTMP_A' (e.g., the omnidirectional camera 100''' transmits the video streams RTMP_A-RTMP_A' as the data packets are encoded).

The clock generator 212 may be configured to generate clock signals for the processors 150a-150n. For example, the clock generator 212 may implement a unified clock generator. In some embodiments, the clock signals generated by the clock generator 212 may be used to activate/deactivate an exposure of the sensors 124a-124a', . . . , 124n-124n'. For example, the clock generator 212 may be configured to synchronize the data packets generated by the processors 150a-150n by controlling a timing of the exposure (e.g., when and for how long) of the sensors 124a-124a', . . . , 124n-124n'. The timing of the exposure of the sensors 124a-124a', . . . , 124n-124n' may be controlled to ensure that the data packets associated with the video streams RTMP_A-RTMP_A', . . . , RTMP_N-RTMP_N' are generated in a particular order (e.g., an order compatible with the stitching operations performed by the external computing device 250).

The inertial measurement unit (IMU) 214 may be configured to capture motion data associated with the omnidirectional camera 100'''. For example, the IMU may be implemented as one or more of an accelerometer, a gyroscope and/or a magnetometer. The motion data captured by the IMU may sent to one or more of the processors 150a-150n. Information from the IMU 214 may be processed by at least one of the processors 150a-150n and transmitted to the external computing device 250 as metadata to be used when performing the stitching operations. The metadata may be transmitted along with one of the video streams RTMP_A-RTMP_A', . . . , RTMP_N-RTMP_N'. For example, the metadata may provide motion data for images captured by the omnidirectional camera 100''' at a particular time. For example, the motion data in the metadata carried by the video stream RTMP_A may apply to the video frames of all the video streams RTMP_A-RTMP_A', . . . , RTMP_N-RTMP_N'. The format of the information from the inertial measurement unit 214 in the metadata may be varied according to the design criteria of a particular implementation. The metadata may be transmitted with one or more of the video streams RTMP_A-RTMP_A', . . . , RTMP_N-RTMP_N'. In one implementation the metadata may be transmitted as a metadata channel separate from the video streams RTMP_A-RTMP_A', . . . , RTMP_N-RTMP_N'. In an example implementation, the metadata may share one or more of (i) a common clock and (ii) a timestamp with the video streams RTMP_A-RTMP_A', . . . , RTMP_N-RTMP_N'. The common clock may be generated based on a common real-time clock. In an example implementation, the timestamps may be based on the common real-time clock.

The communication block 152 may comprise the interface 114' and/or a block (or circuit) 210. The circuit 210 may be a network device configured to receive input from multiple sources and serialize the input into one output (e.g., a multiplexer). For example, the multiplexer 210 may be a switch, a hub, a router, a USB hub, etc. The interface 114' may be compatible with the protocol implemented by the multiplexer 210. The multiplexer 210 may receive the signals VIDEO_A-VIDEO_N from the processors 150a-150n and output the signal STREAM via the interface 114'.

The interface 114' may be configured to transfer data signals and/or receive a power input. For example, the interface 114' may implement a Power over Ethernet (PoE) standard. In another example, the interface 114' may implement a USB standard. Power received by the interface 114' may be used as a power supply for the components of the omnidirectional camera 100'''. The standard implemented by the interface 114' may be varied according to the design criteria of a particular implementation. The interface 114' may be configured to connect to the cable 154.

The omnidirectional camera 100''' may comprise an indicator light 216. The indicator light 216 may be implemented as an LED. For example, the LED 216 may indicate that the omnidirectional camera 100''' is recording by emitting a red light color. In another example, the LED 216 may indicate that the omnidirectional camera 100''' is powered on by emitting a blue light color. The implementation of the LED 216 may be varied according to the design criteria of a particular implementation.

The omnidirectional camera 100''' may comprise a power button 218. The power button 218 may be used to power on and/or power off the omnidirectional camera 100'''. The power button 218 is shown connected to the interface 114'. Generally, the omnidirectional camera 100''' receives power via the interface 114' (e.g., Power over Ethernet (PoE), USB, etc.). The power button 218 may be a switch configured to control the interface 114'.

The processors 150a-150n may be configured to receive data from the associated capture devices 122a-122a', . . . , 122n-122n', the associated audio codec blocks 202a-202n and/or any other associated components (e.g., the IMU 214). The processors 150a-150n may be configured to perform encoding operations on the received video frames (e.g., FRAMES_A-FRAMES_N and FRAMES_A'-FRAMES_N'). In some embodiments, the processors 150a-150n may be configured to receive the audio data from the associated audio codec blocks 202a-202n. In some embodiments, the processors 150a-150n may be configured to implement a TCP/IP stack to transmit data packets of the video streams RTMP_A-RTMP_A', . . . , RTMP_N-RTMP_N'.

The processors 150a-150n may be configured to generate a plurality of video streams (e.g., the video streams RTMP_A-RTMP_A', . . . , RTMP_N-RTMP_N'). The video streams RTMP_A-RTMP_A', . . . , RTMP_N-RTMP_N' generated by the processors 150a-150n may comprise encoded video frames from associated signals FRAMES_A-FRAMES_A', . . . , FRAMES_N-FRAMES_N', associated audio data from the associated audio codec blocks 202a-202n and metadata (e.g., metadata from the IMU 214). The type of data in the video streams RTMP_A-RTMP_A', . . . , RTMP_N-RTMP_N' may be different for each stream. For example, the video stream RTMP_A may carry the encoded video data, the metadata and stereo audio data, while the video stream RTMP_A' may carry only encoded video data.

In some embodiments, the encoding performed by the processors 150a-150n may comprise compression. The processors 150a-150n may be configured to perform various types of compression techniques (e.g., according to the H.264 format, the H.265 format, VP9, etc.). H.264 and H.265 refer to recommendations issued by ITU-T. The equivalent international standards are respectively ISO/IEC 14496-10—MPEG-4 Part 10, Advanced Video Coding, and ISO/IEC 23008-2, High Efficiency Video Coding, issued by ISO. The encoding performed by the processors 150a-150n may be performed in real-time (or near real-time). For example, the processors 150a-150n may perform encoding on data in the signals FRAMES_A-FRAMES_A', . . . , FRAMES_N-FRAMES_N' as soon as the data is received (and before all of the data is received and/or recorded). Initial frames in the signals FRAMES_A-FRAMES_A', . . . , FRAMES_N-FRAMES_N' may be encoded and transmitted as initial portions of the video streams RTMP_A-RTMP_A', . . . , RTMP_N-RTMP_N' as new video frames in the signals FRAMES_A-FRAMES_A', . . . , FRAMES_N-FRAMES_N' are received by the processors 150a-150n. For example, all the data in the signals FRAMES_A-FRAMES_A', . . . , FRAMES_N-FRAMES_N' does not need to be received (or stored) before the processors 150a-150n encode the video streams RTMP_A-RTMP_A', . . . , RTMP_N-RTMP_N'. The type of encoding performed by the processors 150a-150n may be varied according to the design criteria of a particular implementation.

The processors 150a-150n may be configured to apply metadata to the video streams RTMP_A-RTMP_A', . . . , RTMP_N-RTMP_N'. In one example, the metadata may comprise motion data from the IMU 214. In another example, the metadata may comprise a timestamp (e.g., a picture number). A timestamp may be implemented as a number representing a time that a certain piece of data was captured relative to some known event. In an example implementation, MP4 video files implement timestamps which denote a time since a recording started (e.g., in units of $\frac{1}{90,000}$th of a second). Other units may be implemented. A time relative to another event may be implemented. A timestamp is generally implemented to determine the timing of things (or events) relative to each other. In another example, the metadata may comprise Exchangeable Image File Format (EXIF) data. Generally, the metadata comprises information about the video streams RTMP_A-RTMP_A', . . . , RTMP_N-RTMP_N' that may provide additional information to another system or end user (e.g., location, camera specifications, date, camera recording configuration, etc.). The type of metadata may be varied according to the design criteria of a particular implementation.

The processors 150a-150n may be configured to synchronize data packets in the video streams RTMP_A-RTMP_A', . . . , RTMP_N-RTMP_N'. The synchronization of the data packets in the video streams RTMP_A-RTMP_A', . . . , RTMP_N-RTMP_N' may allow the video streams RTMP_A-RTMP_A', . . . , RTMP_N-RTMP_N' to be transmitted in real-time (or near real-time) to other devices (e.g., the external computing device 250). For example, the synchronization may be implemented to ensure that the data is received in a proper order to determine which video frames match the captured images of the environment surrounding the camera 100''' at a particular time. The processors 150a-150n may be configured to perform an exposure synchronization and/or a transmission synchronization. The types of synchronization implemented by the processors 150a-150n may be varied according to the design criteria of a particular implementation.

In some embodiments, the processors 150a-150n may control an exposure synchronization. The exposure synchronization may be implemented to ensure the captured image is exposed at the same time on all of the sensors 124a-124a', . . . , 124n-124n' so that the video frames may be stitched together seamlessly (e.g., any objects in the captured image will not have moved between exposure times). The exposure time of the different sensors 124a-124a', . . . , 124n-124n' may be synchronized to ensure the scene captured in overlapping areas between the lenses 110a-110a', . . . , 110n-110n' is the same scene and can be stitched successfully. The type of exposure synchronization implemented may be varied according to the design criteria of a particular implementation.

In one example, the exposure synchronization may be controlled by a single clock signal (e.g., a unified clock signal from the clock generator 212). The clock generator 212 may transmit the unified clock signal to the processors 150a-150n and the processors 150a-150n may pass the unified clock signal to the associated sensors 124a-124a', . . . , 124n-124n'. In another example, the exposure synchronization may be a master/slave clock configuration. In the master/slave clock configuration, the processors 150a-150n may negotiate a common timing signal with one (e.g., the master) of the capture devices 124a-124a', . . . , 124n-124n' in each subset of the capture devices 124a-124a', . . . , 124n-124n'. The master capture devices 124a-124a', . . . , 124n-124n' in each subset of the capture devices 124a-124a', . . . , 124n-124n' may send the common timing signal to each (e.g., the slaves) of the capture devices 124a-124a', . . . , 124n-124n' in a common subset of the capture devices 124a-124a', . . . , 124n-124n'. In yet another example, the clock generator 212 may send a clock signal to the master capture device in each of the subsets of the capture devices 124a-124a', . . . , 124n-124n', and the master capture device in each subset of the capture devices 124a-124a', . . . , 124n-124n' may send the clock signal to each of the slaves capture devices in the associated subset of the capture devices 124a-124a', . . . , 124n-124n'.

Transmission synchronization may be implemented to reduce processing complexity. The data in the video streams RTMP_A-RTMP_A', . . . , RTMP_N-RTMP_N' may be generated by the processors 150a-150n and the transmission synchronization performed by the processors 150a-150n may be configured to transmit the data packets in a particular order to ensure the encoded video frames in the video streams RTMP_A-RTMP_A', . . . , RTMP_N-RTMP_N' can be stitched together efficiently. For example, the processors 150a-150n may be configured to perform negotiation operations over I$^2$C to implement transmission synchronization. In another example, the processors 150a-150n may be configured to perform negotiation operations over Ethernet to implement transmission synchronization.

After the video streams RTMP_A-RTMP_A', . . . , RTMP_N-RTMP_N' have started to be processed and encoded by the processors 150a-150n, the transmission synchronization may be performed to the data packets of the video streams RTMP_A-RTMP_A', . . . , RTMP_N-RTMP_N' which can be stitched together by the external computing device 250. Since there are multiple processors 150a-150n involved, and the data is sent over the networking interface 114', there may be some randomness in the latency of each data packet. The data packets may be ordered by the transmitter (e.g., the camera 100), the receiver (e.g., the external computing device 250), or both. For example, the processors 150a-150n may be configured to ensure that frames with a timestamp k from each of the video streams RTMP_A-RTMP_A', . . . , RTMP_N-RTMP_N' are transmitted in an order such that the frames with the timestamp k in each of the video streams RTMP_A-RTMP_A', . . . , RTMP_N-RTMP_N' arrive (e.g., at the external computing device 250) roughly at the same time (or one after another). In some embodiments, the processors 150a-150n may transmit the video streams RTMP_A-RTMP_A', . . . , RTMP_N-RTMP_N' and the external computing device 250 may perform the transmission synchronization. The implementation of the transmission synchronization may be varied according to the design criteria of a particular implementation.

Figure 17:
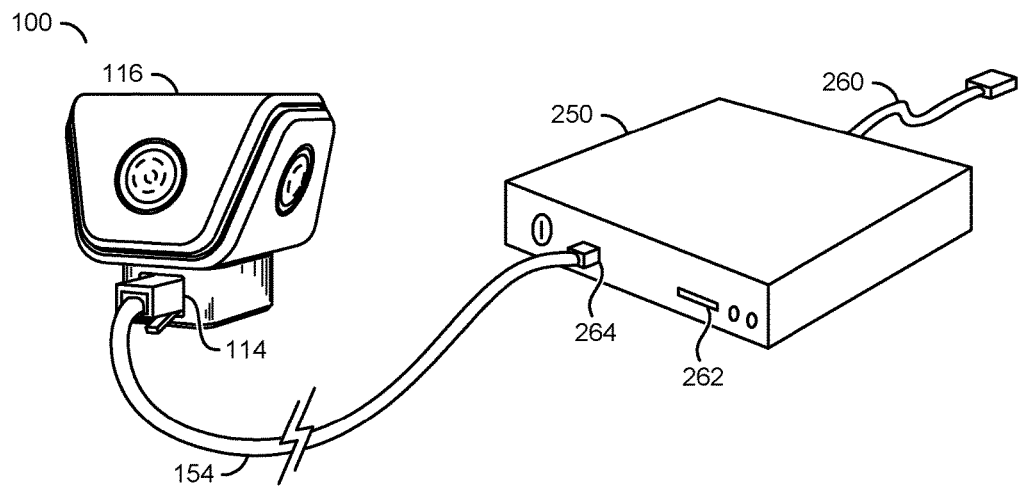
FIG. 17 is a diagram illustrating an example of the camera connected to an external computing device.

Referring to FIG. 17, a diagram illustrating an example of the camera 100 connected to the external computing device 250 is shown. The camera 100 is shown connected to the external computing device 250 using the cable 154. The external computing device 250 is shown as a micro computer. The micro computer is shown having an interface 260. The interface 260 may be configured to transfer the signal SPHEREFOV.

The micro computer 250 may comprise various input/output ports 262. For example, the input/output ports 262 may implement audio input/output, video input/output interfaces, communications ports, power connectors, etc. (e.g., Ethernet, USB, S/PDIF, HDMI, DisplayPort, Thunderbolt, etc.). The input output ports 262 of the micro computer 250 may be varied according to the design criteria of a particular implementation. In an example implementation, a video display may be connected to an HDMI interface (e.g., and example of one of the ports 262).

The micro computer 250 may comprise an interface 264. The interface 264 may be compatible with the interface 114 of the camera 100. In the example shown, the interface 114, the cable 154 and the interface 256 may support an Ethernet standard. In another example, the interface 114, the cable 154 and the interface 256 may support a USB standard. Generally, the interface 114, the cable 154 and the interface 256 support a communications standard capable of transferring data and providing power over the same cable.

In some embodiments, the cable 154 may provide a direct connection between the camera 100 and the micro computer 250 over a distance (e.g., the camera 100 and the micro computer 250 may be separate enclosures). For example, the camera 100 and the micro computer 250 may be configured to operate in the same room. In another example, the camera 100 may operate outdoors and the cable 154 may connect to the micro computer 250 at a nearby indoor location. In yet another example, the camera 100 may operate outdoors and the cable 154 may connect to the micro computer 250 located at a nearby base station (e.g., a vehicle used for news reporting). The arrangement and/or location of the camera 100 and the micro computer 250 may be varied according to the design criteria of a particular implementation.

Figure 18:
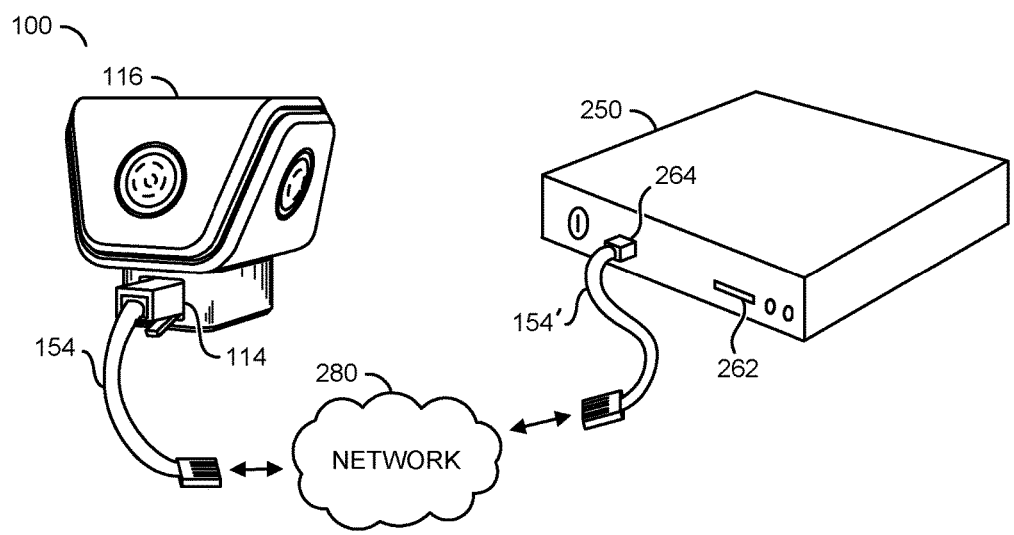
FIG. 18 is a diagram illustrating an example of the camera and the external computing device connected to a network.

Referring to FIG. 18, a diagram illustrating an example of the camera 100 and the external computing device 250 connected to a network 280 is shown. The cable 154 may be used to connect to a communications device (e.g., a switch, a router, a hub, etc.) capable of connecting to the network 280 (e.g., a wide-area network such as the internet). In the configuration shown in FIG. 18, the communications device may provide power to the camera 100. The network 280 may communicate with the micro computer 250 via the cable 154'. In the embodiment shown in FIG. 18, the interface 114 and the interface 264 may not need to be directly compatible and the interface 264 may not need to provide power.

In some embodiments, the network 280 may be configured to transfer information (e.g., the signal STREAM) between the camera 100 and the micro computer 250. The micro computer 250 may be configured to perform the stitching operations for the signal STREAM to generate the signal SPHEREFOV. The micro computer 250 may transmit the signal SPHEREFOV to the network 280 to provide real-time streaming of the spherical field of view.

In some embodiments, the network 280 may comprise a computing service configured to provision available processing resources to scale on demand. For example, the network 280 may provide cloud-based processing. The camera 100 may transfer the signal STREAM to the network 280, the network 280 may perform the stitching operations for the signal STREAM to generate the signal SPHEREFOV. The network 280 may transmit the signal SPHEREFOV to requesting devices such as the microcomputer 250.

Figure 19:
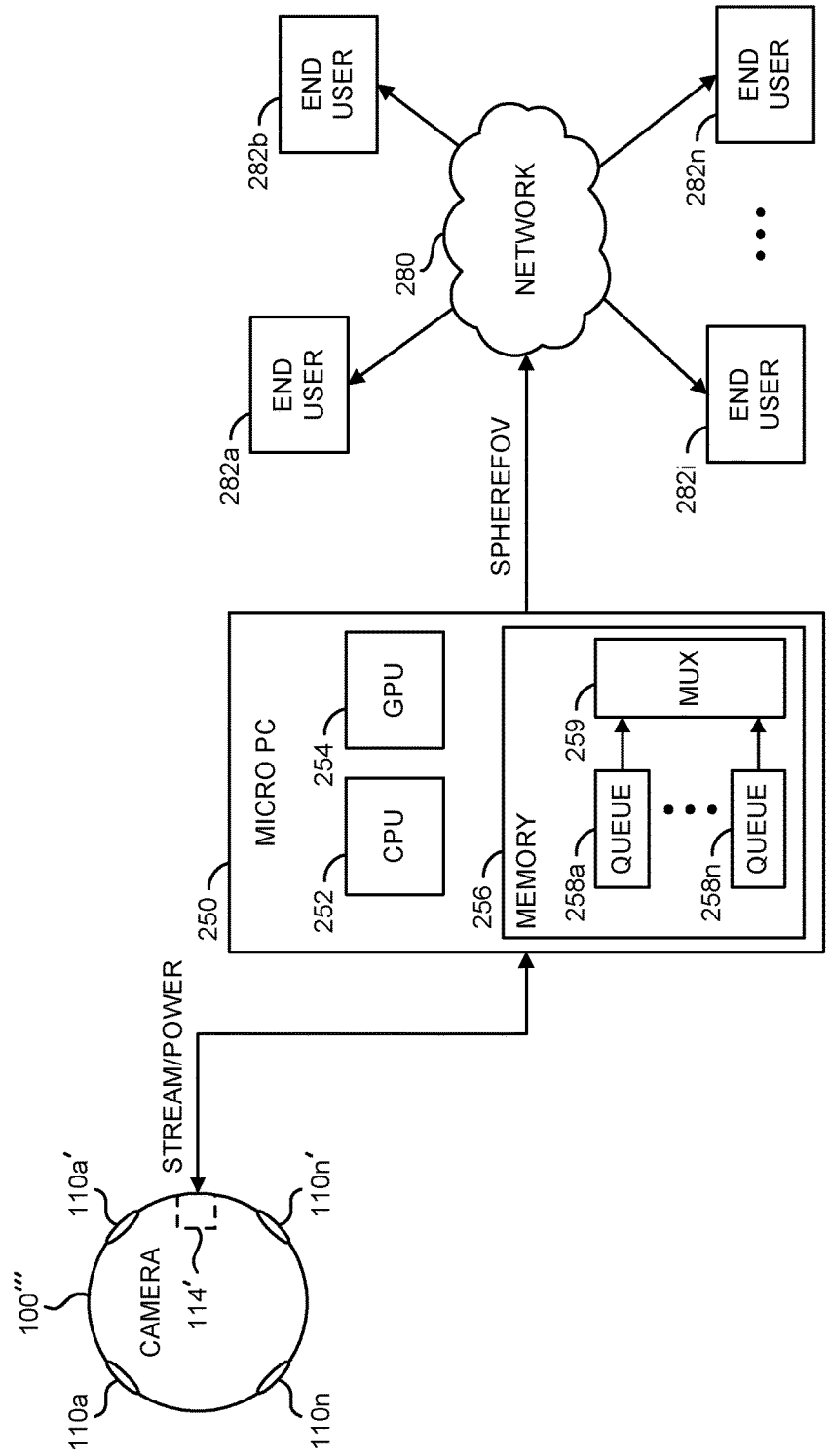
FIG. 19 is a diagram illustrating an embodiment of an omnidirectional camera connected to an external computing device and a content delivery network.

Referring to FIG. 19, a diagram illustrating an embodiment of an omnidirectional camera 100''' connected to the external computing device 250 and the content delivery network 280 is shown. Internal components of the external computing device 250 may comprise a block (or circuit) 252, a block (or circuit) 254 and/or a block (or circuit) 256. The circuit 252 may be a central processing unit (CPU). The circuit 254 may be a graphics processing unit (GPU). The circuit 256 may be a memory. The CPU 252 may implement general processing for the external computing device 250. The GPU 254 may be configured to perform particular graphics intensive calculations. The memory 256 may provide volatile and/or non-volatile data storage.

The CPU 252 and/or the GPU 254 may be configured to transcode the signal STREAM to provide different resolutions and/or compression ratios (e.g., bitrates) for the output signal SPHEREFOV. The CPU 252 and/or the GPU 254 may be configured to switch from one resolution/bitrate to another resolution/bitrate on the fly. The operations performed by the CPU 252 and/or the GPU 254 may be varied according to the design criteria of a particular implementation.

Generally, the CPU 252 may be implemented as a high-performance processor. The GPU 254 may be implemented as a high-performance (e.g., gaming-class) graphics processing unit. For example, conventional mobile-class processing units may not be powerful enough to perform the stitching and/or transcoding operations.

The memory 256 may be configured to receive the signal STREAM. For example, the memory 256 may buffer the incoming data packets in the signal STREAM. In some embodiments, the memory 256 may be used to synchronize the data packets in the signal STREAM. In some embodiments, the memory 256 may be used to store the signal SPHEREFOV. For example, after performing the stitching operations on the signals RTMP_A-RTMP_A', . . . , RTMP_N-RTMP_N', the external computing device 250 may be configured to encode the signals RTMP_A-RTMP_A', . . . , RTMP_N-RTMP_N' to create the file SPHEREFOV for storage in the memory 256. In some embodiments, the file SPHEREFOV may be transcoded into multiple bitstreams (e.g., high resolution bitstreams, low resolution bitstreams, etc.) and stored in the memory 256.

The memory 256 may comprise blocks (or circuits) 258a-258n and/or a block (or circuit) 259. The circuits 258a-258n may implement queues. The circuit 259 may implement a multiplexer. In some embodiments, the video streams RTMP_A-RTMP_A', . . . , RTMP_N-RTMP_N' may not be synchronized in the camera 100''' before being transmitted to the external computing device 250. When the video streams RTMP_A-RTMP_A', . . . , RTMP_N-RTMP_N' are not synchronized before reaching the external computing device 250, the data packets of the signal STREAM may be buffered in the queues 258a-258n. The data packets may be interleaved to synchronize the video streams RTMP_A-RTMP_A', . . . , RTMP_N-RTMP_N'. The multiplexer 259 may be configured to receive the interleaved data packets from the queues 258a-258n. When the video streams RTMP_A-RTMP_A', . . . , RTMP_N-RTMP_N' are synchronized, the CPU 252 and/or the GPU 254 may efficiently perform the video stitching operations (e.g., generate a spherical field of view while reducing distortion).

In some embodiments, the external computing device 250 may be configured to transfer the signal SPHEREFOV to the network 280. In one example, the network 280 may be a content delivery network. In another example, the network 280 may be a remote server. The content delivery network 280 may be configured to distribute the signal SPHEREFOV to one or more end users 282a-282n. For example, the content delivery network 280 may stream the video file SPHEREFOV received from the external computing device 250 to the end users 282a-282n in real-time (or near real-time).

The camera 100''' may capture the images, encode the video streams RTMP_A-RTMP_A', . . . , RTMP_N-RTMP_N', and transfer the video streams RTMP_A-RTMP_A', . . . , RTMP_N-RTMP_N' to the external computing device 250 as the signal STREAM. The external computing device 250 may receive the signal STREAM, decode the video streams RTMP_A-RTMP_A', . . . , RTMP_N-RTMP_N', perform the video stitching operations, generate the signal SPHEREFOV, and transfer the signal SPHEREFOV to the network 280. The network 280 may distribute the signal SPHEREFOV to the end users 282a-282n. Each of the capturing, encoding and transferring operations performed by the camera 100''', decoding, video stitching and transferring operations performed by the external computing device 250 and the distribution operations performed by the network 280 may be performed in real-time (or near real-time). For example, initial encoded video frames in the video streams RTMP_A-RTMP_A', . . . , RTMP_N-RTMP_N', may be transferred to the external computing device 250 for video stitching operations while the camera 100''' receives new images and generates the next encoded video frames for the video streams RTMP_A-RTMP_A', . . . , RTMP_N-RTMP_N'. Similarly, the network 280 may distribute initial video frames for the signal SPHEREFOV as the external video device 250 performs the video stitching operations on the next decoded video frames of the video streams RTMP_A-RTMP_A', . . . , RTMP_N-RTMP_N' to generate the next video frames of the signal SPHEREFOV.

The external computing device 250 may receive the single video signal (e.g., STREAM), perform the stitching operations and then re-encode the stitched video to create the signal SPHEREFOV. The external computing device 250 may transfer the omnidirectional video SPHEREFOV to the content distribution network 280. In some embodiments, the content distribution network 280 may implement cloud processing (e.g., distributed processing configured to scale according to demand). The cloud processing may receive the signal SPHEREFOV, transcode the signal SPHEREFOV to multiple omnidirectional video streams (e.g., different resolutions, different compression ratios, different bitrates, etc.) then distribute the transcoded omnidirectional videos to the end users 282a-282n on demand.

Which version of the transcoded omnidirectional is transmitted to the end users 282a-282n may be based on factors. Factors include transmission availability factors. Available bandwidth may be one factor. Another factor may be end user device decoding capabilities (e.g., supported codecs, screen resolution, CPU power, presence of dedicated decoding hardware, etc). A user subscription level (e.g., did a user pay for HD quality or upgrade to 4K quality?). The content delivery infrastructure implemented may support several video codecs and/or multiplexers to address a variety of target platforms.

In some embodiments, a higher resolution version of the transcoded omnidirectional video SPHEREFOV may be transmitted to one of the end users 282a-282n when more resources (e.g., availability factors) are available. A lower resolution version of the transcoded omnidirectional video SPHEREFOV may be transmitted to the end users 282a-282n when fewer resources (e.g., availability factors) are available. For example, the end user 282a may have high resources available and the content delivery network 282 may begin delivering a high resolution version of the transcoded omnidirectional video SPHEREFOV to the end user 282a. At some later time, less resources may be available for the end user 282a. The stream may switch to a lower resolution version of the transcoded omnidirectional SPHEREFOV for the end user 282a (e.g., the stream received by the end user 282 may switch seamlessly, or with little disruption to the viewing experience in response to a change in the available resources). The switch of video streams typically results in a change in quality. Quality parameters may include resolution (typically measured in megapixels), frame rate (typically measured in frames per second), bitrate (typically measured in bits per second, or alternatively specified using a compression ratio number), pixel depth (typically measured in bits per pixel), etc.

Figure 20:
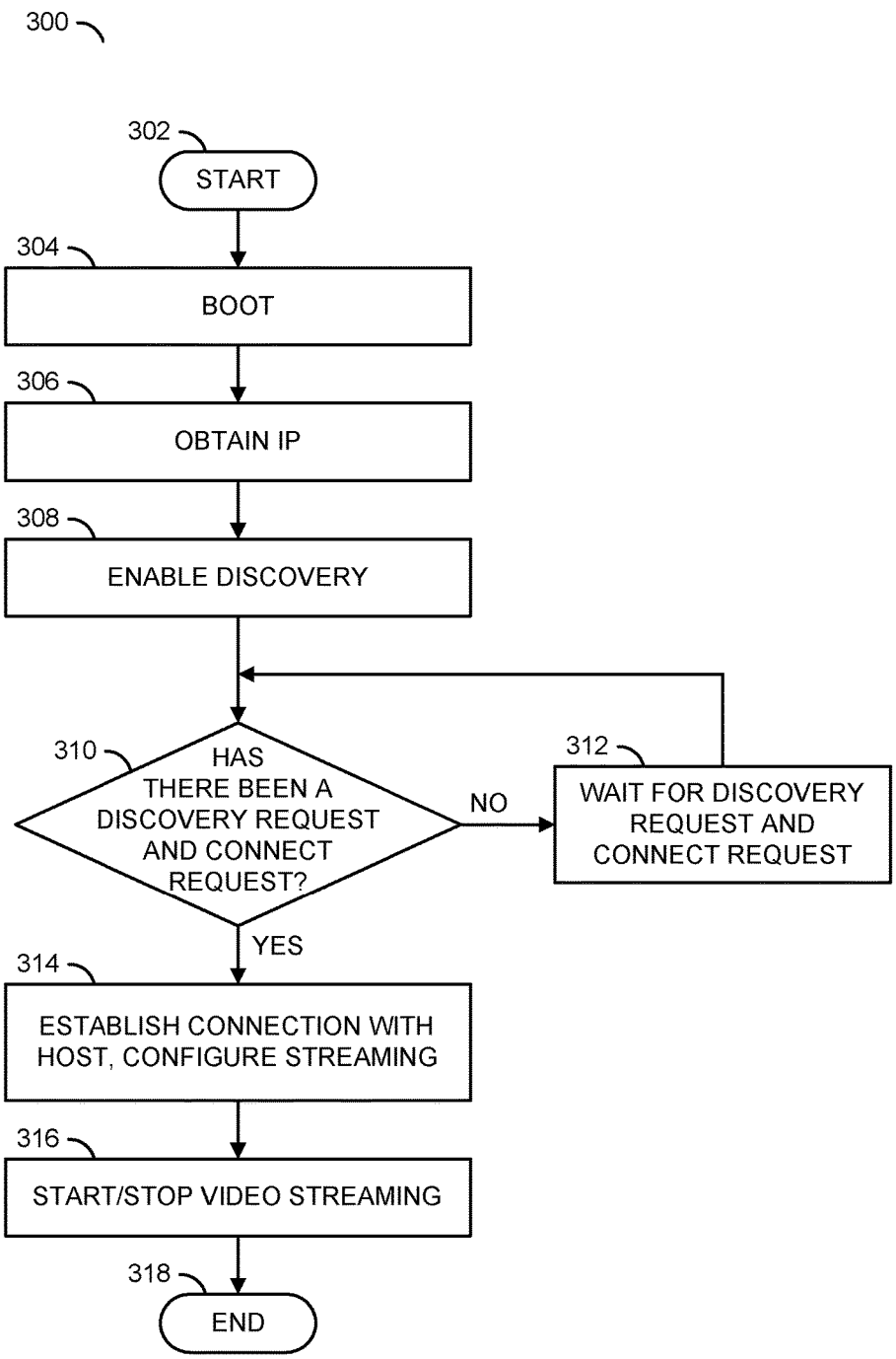
FIG. 20 is a flow diagram illustrating a startup procedure.

Referring to FIG. 20, a method (or process) 300 is shown. The method 300 may perform a startup procedure. The method 300 generally comprises a step (or state) 302, a step (or state) 304, a step (or state) 306, a step (or state) 308, a decision step (or state) 310, a step (or state) 312, a step (or state) 314, a step (or state) 316, and a step (or state) 318.

The state 302 may start the method 300. Next, in the state 304, the circuit 120 and/or other components of the omnidirectional camera 100''' may boot (e.g., initialize all the components). In the step 306, the communication block 152 may obtain an IP address (e.g., obtain an IP address for the camera 100''' on an external network). In the step 308, the communication block 152 may enable discovery. Next, the method 300 may move to the decision state 310.

In the decision state 310, the communication block 152 may determine whether there has been a discovery request and/or a connect request. If the decision state 310 determines there has not been a discovery request and a connect request, the method 300 may move to the state 312. In the state 312, the communication block 152 may wait for a discovery request and a connect request. Next, the method 300 may return to the decision state 310. If the decision state 310 determines there has been a discovery request and a connect request, the method 300 may move to the state 314.

In the state 314, the communication block 152 may establish a connection with a host (e.g., the external computing device 250) and configure streaming. In the state 316, the processors 150a-150n may start/stop streaming. Next, the method 300 may move to the state 318. The state 318 may end the method 300.

Figure 21:
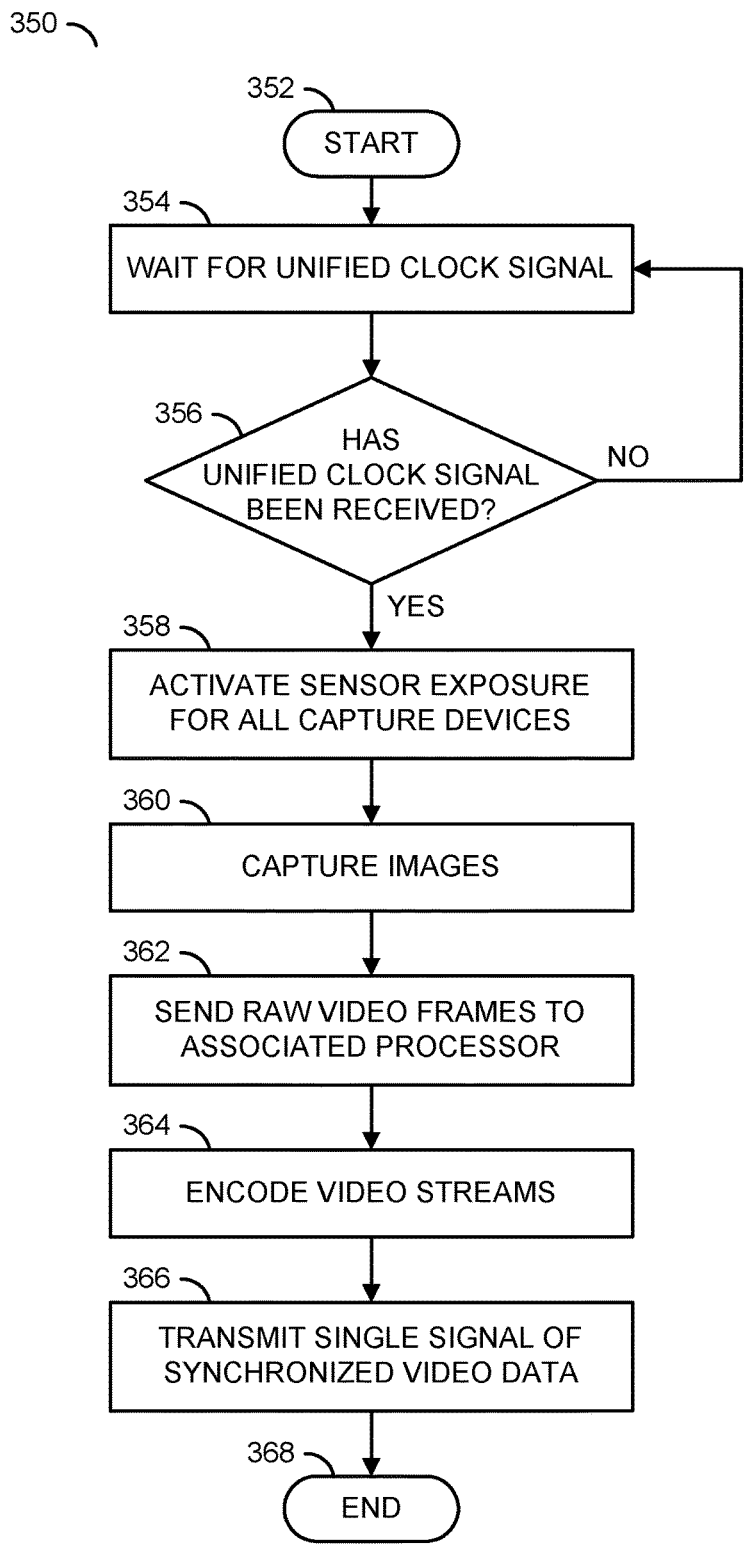
FIG. 21 is a flow diagram illustrating a synchronization of sensor exposure.

Referring to FIG. 21, a method (or process) 350 is shown. The method 350 may synchronize sensor exposures. The method 350 generally comprises a step (or state) 352, a step (or state) 354, a decision step (or state) 356, a step (or state) 358, a step (or state) 360, a step (or state) 362, a step (or state) 364, a step (or state) 366, and a step (or state) 368.

The state 352 may start the method 350. In the state 354, the sensors 124a-124a', . . . , 124n-124n' may wait for a unified clock signal (e.g., from the clock generator 212). Next, the method 350 may move to the decision state 356. In the decision state 356, the sensors 124a-124a', . . . , 124n-124n' may determine whether the unified clock signal has been received.

If the decision state 356 determines the unified clock signal has not been received, the method 350 may return to the state 354. If the decision state 356 determines the unified clock signal has been received, the method 350 may move to the state 358. In the state 358, the sensor exposure for the sensors 124a-124a', . . . , 124n-124n' may be activated for all capture devices. Next, in the state 360, the capture devices 122a-122a', . . . , 122n-122n' may capture images. In the state 362, the capture devices 122a-122a', . . . , 122n-122n' may send raw video frames (e.g., the signals FRAMES_A-FRAMES_A', . . . , FRAMES_N-FRAMES_N') to the associated processors 150a-150n.

In the state 364, the processors 150a-150n may encode the video streams RTMP_A-RTMP_A', . . . , RTMP_N-RTMP_N'. In the state 366, the communication block 152 may transmit the single signal STREAM comprising synchronized video data (e.g., the data packets in the video streams RTMP_A-RTMP_A', . . . , RTMP_N-RTMP_N' may be synchronized for efficient video stitching). Next, the method 350 may move to the state 368. The state 368 may end the method 350.

Figure 22:
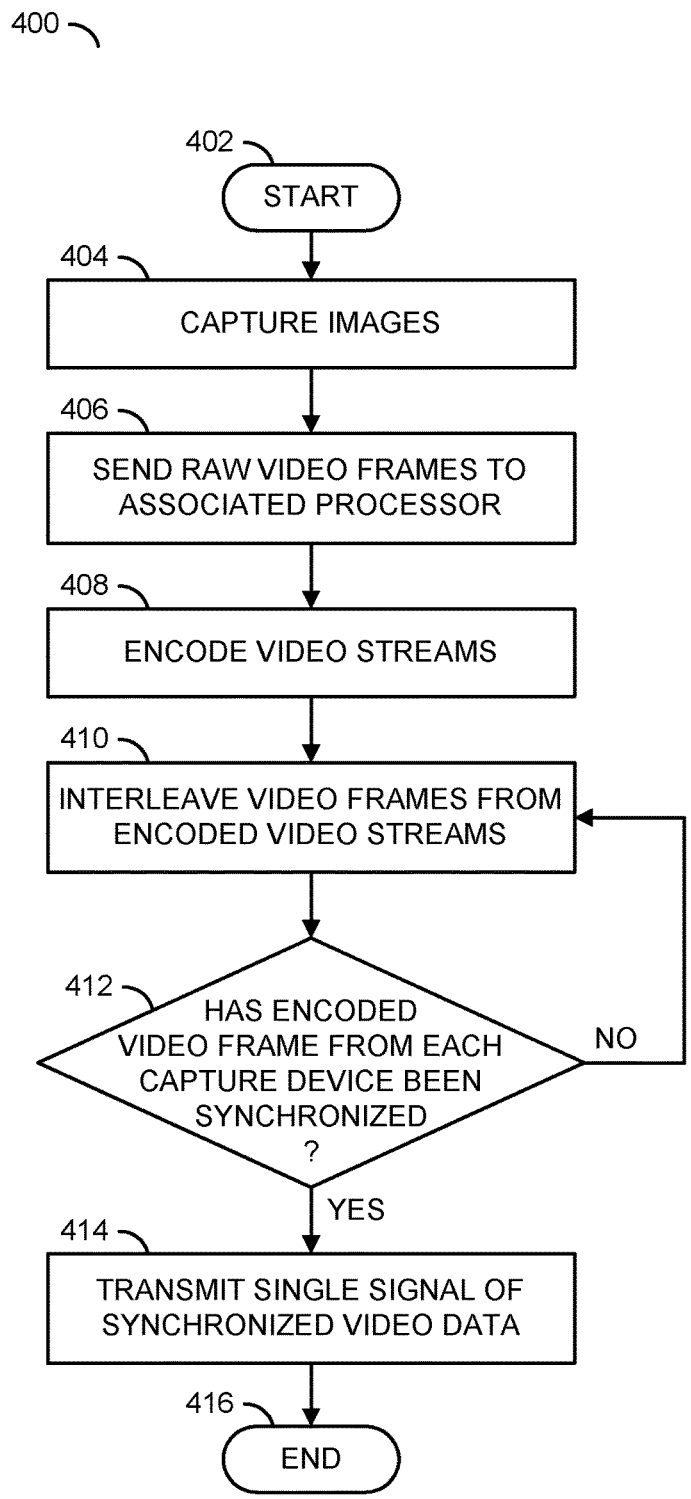
FIG. 22 is a flow diagram illustrating a transmission synchronization performed by the omnidirectional camera.

Referring to FIG. 22, a method (or process) 400 is shown. The method 400 may implement transmission synchronization by the omnidirectional camera 100. The method 400 generally comprises a step (or state) 402, a step (or state) 404, a step (or state) 406, a step (or state) 408, a step (or state) 410, a decision step (or state) 412, a step (or state) 414, and a step (or state) 416.

The state 402 may start the method 400. In the state 404, the capture devices 122a-122a', . . . , 122n-122n' may capture images. Next, in the state 406, the capture devices 122a-122a', . . . , 122n-122n' may send the raw video frames (e.g., FRAMES_A-FRAMES_A', . . . , FRAMES_N-FRAMES_N') to the associated processors 150a-150n. In the state 408, the processors 150a-150n may encode the video streams RTMP_A-RTMP_A', . . . , RTMP_N-RTMP_N'. Next, in the state 410, the processors 150a-150n may interleave the video frames from the encoded video streams RTMP_A-RTMP_A', . . . , RTMP_N-RTMP_N' (e.g., perform transmission synchronization). Next, the method 400 may move to the decision state 412.

In the decision state 412, the processors 150a-150n may determine whether the encoded video frame from each of the capture devices 122a-122a', . . . , 122n-122n' has been synchronized. If the decision state 412 determines that the encoded video frame from each of the capture devices 122a-122a', . . . , 122n-122n' has not been synchronized, the method 400 may return to the state 410. If the decision state 412 determines that the encoded video frame from each of the capture devices 122a-122a', . . . , 122n-122n' has been synchronized, the method 400 may move to the state 414. In the state 414, the communication block 152 may transmit the single signal of synchronized video data (e.g., the signal STREAM). Next, the method 416 may move to the state 416. The state 416 may end the method 400.

Figure 23:
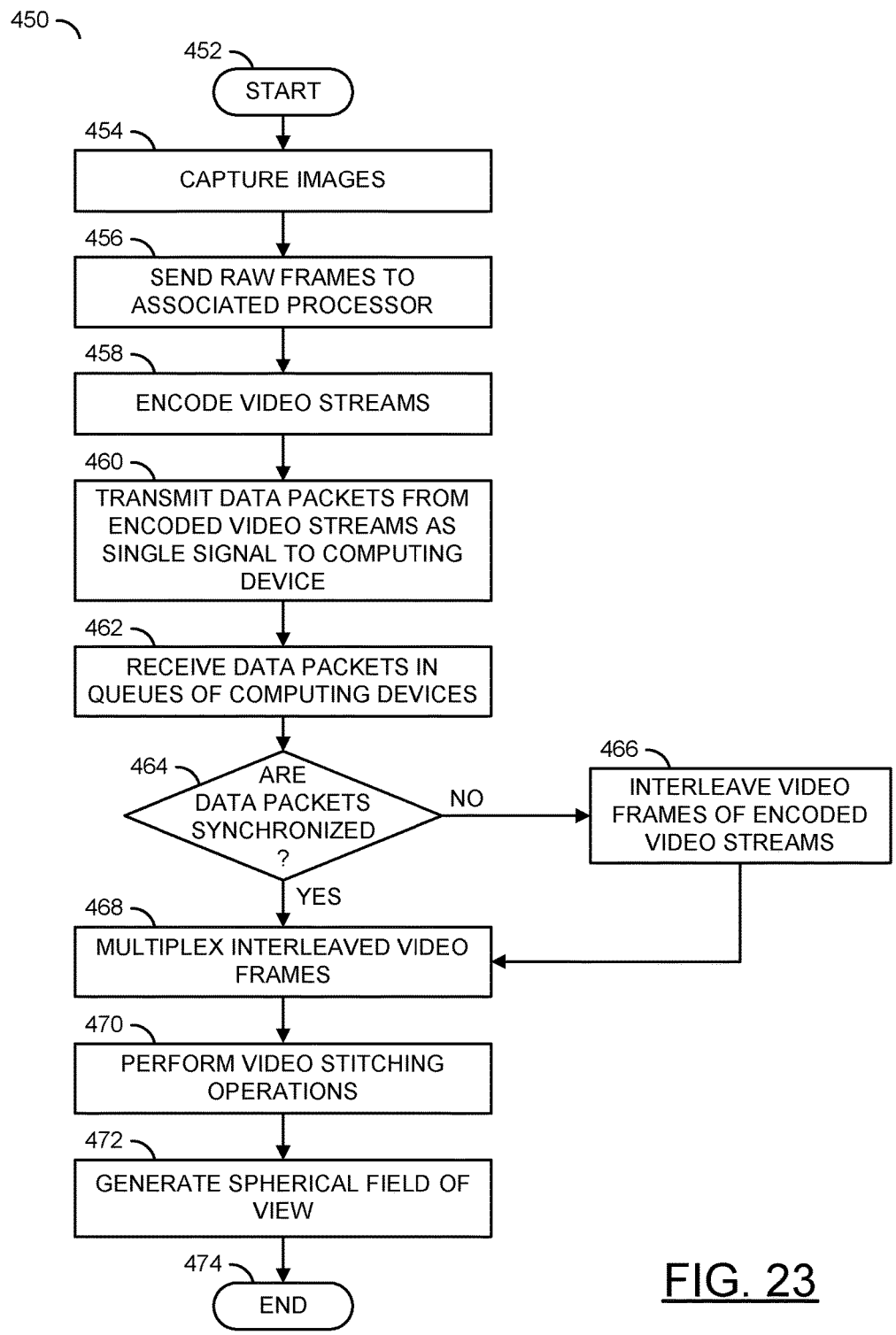
FIG. 23 is a flow diagram illustrating a transmission synchronization performed by the external computing device.

Referring to FIG. 23, a method (or process) 450 is shown. The method 450 may implement transmission synchronization by external computing device 250. The method 450 generally comprises a step (or state) 452, a step (or state) 454, a step (or state) 456, a step (or state) 458, a step (or state) 460, a step (or state) 462, a decision step (or state) 464, a step (or state) 466, a step (or state) 468, a step (or state) 470, a step (or state) 472, and a step (or state) 474.

The state 452 may start the method 450. In the state 454, the capture devices 122a-122a', . . . , 122n-122n' may capture images. In the state 456, the capture devices 122a-122a', . . . , 122n-122n' may send the raw video frames (e.g., FRAMES_A-FRAMES_A', . . . , FRAMES_N-FRAMES_N') to the associated processors 150a-150n. Next, in the state 458, the processors 150a-150n may encode the video streams RTMP_A-RTMP_A', . . . , RTMP_N-RTMP_N'. In the state 460, the communication block 152 may transmit data packets from the encoded video streams RTMP_A-RTMP_A', . . . , RTMP_N-RTMP_N' to the computing device 250 (e.g., no transmission synchronization is performed by the omnidirectional camera 100'''). In the state 462, the data packets of the video streams RTMP_A-RTMP_A', . . . , RTMP_N-RTMP_N' may be received in the queues 258a-258n of the external computing device 250. Next, the method 450 may move to the decision state 464.

In the decision state 464, the external computing device 250 (e.g., using a combination of the CPU 252, the GPU 254 and the memory 256) may determine whether the data packets are synchronized. If the decision state 464 determines the data packets are not synchronized, the method 450 may move to the state 466. In the state 466, the external computing device (e.g., using a combination of the CPU 252, the GPU 254 and the memory 256) may interleave the frames of the encoded video streams RTMP_A-RTMP_A', . . . , RTMP_N-RTMP_N'. Next, the method 450 may move to the state 468. If the decision state 464 determines the data packets are synchronized, the method 450 may move to the state 468.

In the state 468, the multiplexer 259 may multiplex the interleaved video frames. Next, in the state 470, the external computing device 250 (e.g., using a combination of the CPU 252, the GPU 254 and the memory 256) may perform the video stitching operations. In the state 472, the external computing device 250 may generate the spherical field of view SPHEREFOV. Next, the method 450 may move to the state 472. The state 472 may end the method 450.

Figure 24:
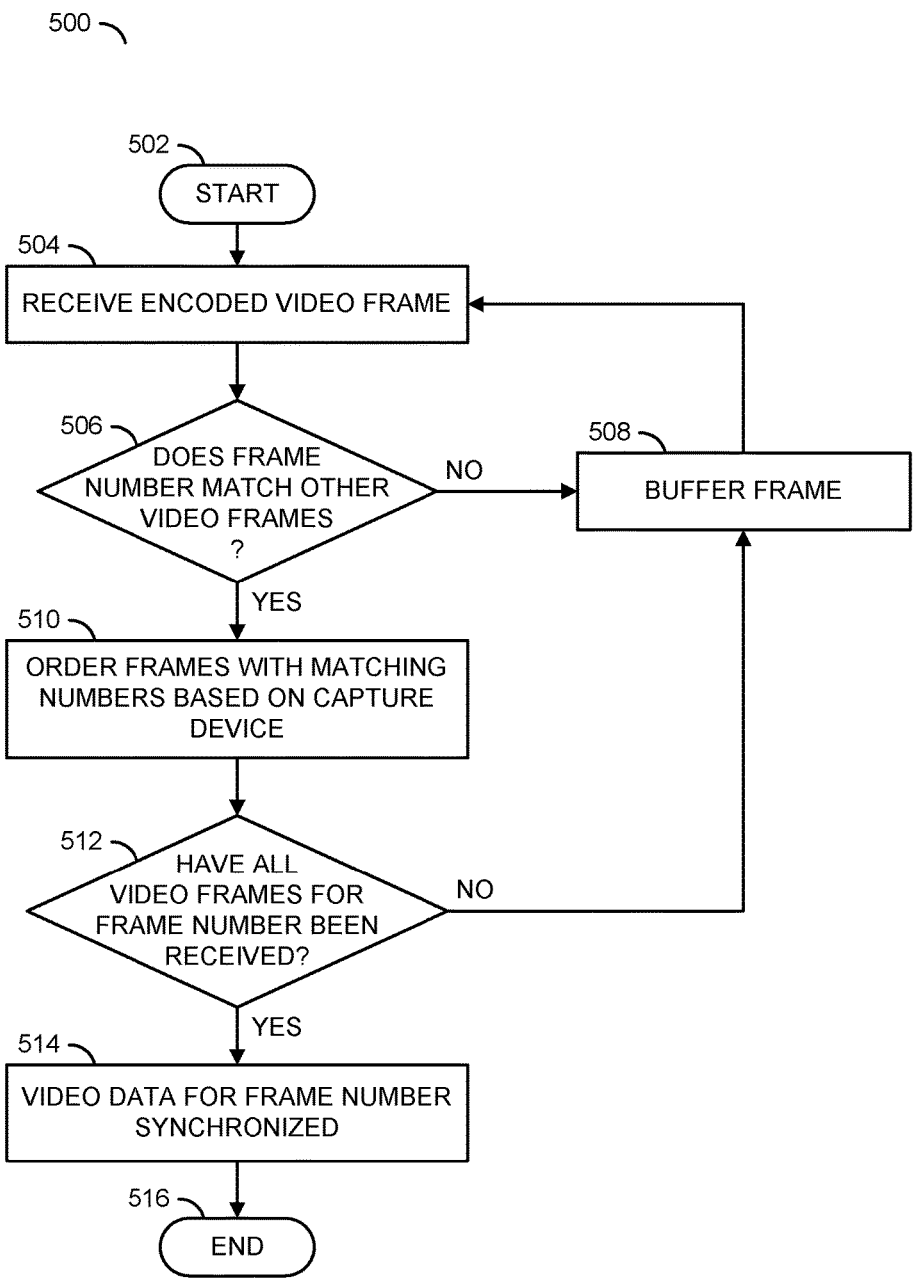
FIG. 24 is a flow diagram illustrating an example of interleaving video frames.

Referring to FIG. 24, a method (or process) 500 is shown. The method 500 may implement an example of interleaving video frames. The method 500 generally comprises a step (or state) 502, a step (or state) 504, a decision step (or state) 506, a step (or state) 508, a step (or state) 510, a decision step (or state) 512, a step (or state) 514, and a step (or state) 516.

The state 502 may start the method 500. In the state 504, the processors 150a-150n (or the queues 258a-258n in the external computing device 250) may receive an encoded video frame from the video streams RTMP_A-RTMP_A', . . . , RTMP_N-RTMP_N'. Next, the method 500 may move to the decision state 506. In the decision state 506, the processors 150a-150n (or the external computing device 250) may determines whether a frame number (e.g., a frame with the same timestamp) matches other video frames that have been received. For example, a frame k of the video stream RTMP_A would match a frame k from the video stream RTMP_N'.

If the decision state 506 determines the video frame number does not match other video frames that have been received, the method 500 may move to the state 508. In the state 508, the processors 150a-150n may buffer (e.g., in the memory blocks 206a-206n) the video frame (or the external computing device 250 may use the queues 258a-258n to buffer the video frame). If the decision state 506 determines the video frame number does match other video frames that have been received, the method 500 may move to the state 510. In the state 510, the processors 150a-150n (or the queues 258a-258n) may order the video frames with matching numbers based on the capture devices 122a-122a', . . . , 122n-122n'. Next, the method 500 may move to the decision state 512.

In the decision state 512, the processors 150a-150n (or the external computing device 250) may determine whether all the video frames for the frame number have been received. If all the video frames for the frame number have not been received, the method 500 may return to the state 508. If all the video frames for the frame number have been received, the method 500 may move to the state 514. In the state 514, the processors 150a-150n (or the external computing device 250) may determine that the video data for the frame number has been synchronized. Next, the method 500 may move to the state 516. The state 516 may end the method 500.

The camera 100 may implement a flexible architecture to allow live video stitching and/or streaming of a spherical video. In some embodiments, the camera 100 may synchronize the video streams RTMP_A-RTMP_A' and RTMP_B-RTMP_B' (and other captured video signals such as RTMP_N-RTMP_N') into the signal STREAM. The signal STREAM may be used in stitching operations performed by the external computing device 250. The stitched video signal SPHEREFOV may be a video providing a spherical field of view (e.g., a video usable in a virtual reality application and/or a 360 degree video application).

The camera 100 may be configured to have multiple sensors connected to each processor (e.g., the sensors 122a-122a' connected to the processor 150a). The camera 100 may be comprised of multiple processors (e.g., 150a-150n). In one embodiment shown in FIG. 5, there may be two sensors per processor (e.g., the sensors 122a-122a' and 122b-122b') and two processors per camera (e.g., the processors 150a-150b). In some embodiments, there may be four sensors per processor (e.g., sensors 122a, 122a', 122a" and 122a'" for the processor 150a, sensors 122b, 122b', 122b" and 122b'" for the processor 150b, etc.) and three processors per camera (e.g., the processors 150a-150c). In some embodiments, there may be many sensors per processor (e.g., sensors 122a, 122a', 122a", . . . , 122a$^{(n)}$" for the processor 150a, etc.) and many processors per camera (e.g., the processors 150a-150n).

Instead of waiting for recording to be completed or storing the video streams RTMP_A-RTMP_A', . . . , RTMP_N-RTMP_N' produced by each of the processors 150a-150n as files on a storage medium, the output video streams RTMP_A-RTMP_A', . . . , RTMP_N-RTMP_N' from the processors 150a-150n may be streamed using the communication block 152 (e.g., output via the network interface 114). In some embodiments, the camera 100 may output the video streams RTMP_A-RTMP_A', . . . , RTMP_N-RTMP_N' via the network interface 114 (e.g., Ethernet or USB) to an external switch (or hub) configured to combine the video streams RTMP_A-RTMP_A', . . . , RTMP_N-RTMP_N' into the single transmission STREAM (e.g., forward the data packets). In some embodiments, the video streams RTMP_A-RTMP_A', . . . , RTMP_N-RTMP_N' may be combined into the signal transmission STREAM by the communication block 152 and the signal STREAM may be output via the interface 114. The signal STREAM may be transmitted over a single cable (e.g., the cable 154) to a dedicated external computing device 250 (e.g., a microPC). The external computing device 250 may perform stitching operations on the video streams RTMP_A-RTMP_A', . . . , RTMP_N-RTMP_N' to create the single video stream SPHEREFOV representing the spherical field of view captured by the camera 100.

The external computing device 250 may be configured to transmit the resulting spherical video SPHEREFOV (e.g., stream live in real-time or near real-time) over another network interface 260 (e.g., Ethernet, WiFi, LTE, etc.). For example the external computing device 250 may be configured to transmit the single video stream SPHEREFOV to a cloud server (e.g., the content delivery network 280) which may then distribute the single video stream SPHEREFOV to multiple end-users. In another example, the external computing device 250 may be configured to transmit the single video stream SPHEREFOV to a user device (e.g., a direct connection to a desktop computer, a smartphone, a tablet computer, a head mounted display, etc.). In yet another example, the external computing device 250 may be configured to connect to a network device (e.g., a switch, a hub, a router, etc.) and connect to an end user device via the network device. The implementation of the distribution of the stitched video stream SPHEREFOV may be varied according to the design criteria of a particular implementation.

In some embodiments, the camera 100 may not implement independent storage for the video streams RTMP_A-RTMP_A', . . . , RTMP_N-RTMP_N'. For example, not implementing independent storage for the video streams RTMP_A-RTMP_A', . . . , RTMP_N-RTMP_N' may reduce cost and/or allow the video streams RTMP_A-RTMP_A', . . . , RTMP_N-RTMP_N' to be transmitted in real-time (or near real-time). In some embodiments, the camera 100 may implement a memory for the video streams RTMP_A-RTMP_A', . . . , RTMP_N-RTMP_N'. For example, the memory may provide a buffer for high resolution streams (e.g., if the network does not have the capacity to transmit the signals VIDEO_A-VIDEO_N to the external computing device 250).

In some embodiments, the camera 100 may be implemented with no independent source of power. Generally, and all power to the camera 100 is provided from the external computing device 250. For example, the camera 100, the cable 154 and the external computing device may implement a Power over Ethernet (PoE) or a Universal Serial Bus (USB) standard. The cable 154 may be implemented to transmit all the video streams RTMP_A-RTMP_A', ..., RTMP_N-RTMP_N' generated by the camera 100 to the external computing device 250 and the power (e.g., the signal POWER) generated by the external computing device 250 to the camera 100.

The multiple video streams RTMP_A-RTMP_A', ..., RTMP_N-RTMP_N' being transmitted over the single cable 154 may be synchronized in one or more ways. In some embodiments, a timing of exposures of the multiple sensors 122*a*-122*a'*, ..., 122*n*-122*n'* in the camera 100 may be synchronized using a timing mechanism. For example, the clock generator 212 may implement a single unified clock. In another example, a negotiation method over I$^2$C and/or over Ethernet may be implemented.

In some embodiments, transmission of the multiple streams RTMP_A-RTMP_A', ..., RTMP_N-RTMP_N' may be implemented to ensure that the frames from the various streams RTMP_A-RTMP_A', ..., RTMP_N-RTMP_N' are interleaved. For example, if a video frame k from the video stream RTMP_A is denoted as Ak (and a video frame k from the video stream RTMP_A' is denoted as A'k, a video frame k from the video stream RTMP_B is denoted as Bk and a video frame k from the video stream RTMP_B' is denoted as B'k, etc.) then the data STREAM transmitted over the network cable 154 may be arranged as: A1, A'1, B1, B'1, A2, A'2, B2, B'2, ..., N'n.

In some embodiments, the external computing device 250 may implement multiple queues 258*a*-258*n* (e.g., in the memory 256) and a multiplexer module 259. The multiple queues 258*a*-258*n* may be used to synchronize video frames from the video streams RTMP_A-RTMP_A', ..., RTMP_N-RTMP_N' (e.g., if they are not yet in an order suitable for performing video stitching operations).

The functions and structures illustrated in the diagrams of FIGS. 1 to 24 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a plurality of image modules each comprising (i) a sensor configured to capture images and (ii) a lens mounted to said sensor; and
   a plurality of processors each configured to (A) receive said images from a subset of said plurality of image modules and (B) generate a plurality of video streams, wherein (i) each one of said video streams is generated by one of said processors in response to said images received from one of said image modules, (ii) said subset of said plurality of image modules comprises at least two distinct image modules of said plurality of image modules, (iii) said lenses are arranged to allow said images to provide coverage for a spherical field of view of a scene surrounding the apparatus, (iv) said multiple streams share a common system clock and (v) one or more timestamps are based on a common real-time clock.

2. The apparatus according to claim 1, further comprising: an interface configured to (i) connect said apparatus to an external device and (ii) provide power to said apparatus.

3. The apparatus according to claim 2, wherein said interface is compliant with at least one of a (i) Power Over Ethernet (PoE) standard and (ii) a Universal Serial Bus (USB) standard.

4. The apparatus according to claim 2, wherein said interface is configured to use a single cable to (i) transmit said plurality of video streams and (ii) receive power for said apparatus.

5. The apparatus according to claim 1, further comprising: a communication circuit configured to (i) receive said plurality of video streams packaged by said plurality of processors, (ii) forward said plurality of video streams into a single transmission and (iii) transmit said single transmission to a network, wherein said single transmission transmits said plurality of video streams on a first in first out basis.

6. The apparatus according to claim 1, further configured to synchronize exposures of said plurality of image modules for video stitching operations performed by an external computing device.

7. The apparatus according to claim 6, wherein said synchronization is performed by at least one of (a) a unified clock generator, (b) a circuit configured to perform negotiation operations over I$^2$C, (c) a circuit configured to perform negotiation operations over Ethernet and (d) one of said image modules providing a clock signal to other of said plurality of image modules.

8. The apparatus according to claim 1, wherein (i) said apparatus further comprises an inertial measurement unit connected to at least one of said plurality of processors and (ii) information recorded by said inertial measurement unit is transmitted as one of (a) metadata with at least one of said video streams and (b) a metadata channel separate from said video streams.

9. The apparatus according to claim 8, wherein said metadata shares one of (i) a common clock and (ii) a timestamp with said video streams, wherein said common clock or said timestamp is generated based on a common real-time clock.

10. The apparatus according to claim 8, further comprising:
an interface configured to (i) connect said apparatus to an external device and (ii) provide power to said apparatus.

11. The apparatus according to claim 10, wherein (A) said interface is compliant with at least one of a (i) Power Over Ethernet (POE) standard and (ii) a Universal Serial Bus (USB) standard and (B) said interface is configured to use a single cable to (i) transmit said first video stream, said second video stream, said third video stream and said fourth video stream and (ii) receive power for said apparatus.

12. An apparatus comprising:
a casing configured to secure a plurality of sensors, each of said sensors configured to capture images;
a first processor configured to receive (i) said images from a first of said plurality of sensors and (ii) said images from a second of said plurality of sensors; and
a second processor configured to receive (i) said images from a third of said plurality of sensors and (ii) said images from a fourth of said plurality of sensors, wherein (i) said first processor is configured to generate (a) a first video stream in response to said images from said first of said plurality of sensors and a second video stream in response to said images from said second of said plurality of sensors and (b) said second processor is configured to generate a third video stream in response to said images from said third of said plurality of sensors and a fourth video stream in response to said images from said fourth of said plurality of sensors and (ii) lenses for said sensors are arranged to allow said images to provide coverage for a spherical field of view of a scene surrounding the apparatus.

13. The apparatus according to claim 12, further comprising:
a communication circuit configured to (i) receive said first video stream, said second video stream, said third video stream and said fourth video stream packaged by said first processor and said second processor, (ii) forward said first video stream, said second video stream, said third video stream and said fourth video stream into a single transmission and (iii) transmit said single transmission to a network, wherein said single transmission transmits said first video stream, said second video stream, said third video stream and said fourth video stream on a first in first out basis.

14. The apparatus according to claim 13, wherein said apparatus uses said communication circuit to transmit said single transmission without storing said first video stream, said second video stream, said third video stream and said fourth video stream.

15. The apparatus according to claim 12, further configured to synchronize exposures of said plurality of sensors for video stitching operations performed by an external computing device.

16. The apparatus according to claim 15, wherein said synchronization is performed by at least one of (a) a unified clock generator, (b) a circuit configured to perform negotiation operations over $I^2C$, (c) a circuit configured to perform negotiation operations over Ethernet and (d) one of said sensors providing a clock signal to other of said plurality of sensors.

17. The apparatus according to claim 12, wherein (i) said apparatus further comprises an inertial measurement unit connected to said first processor and (ii) information recorded by said inertial measurement unit is transmitted as one of (a) metadata with at least one of said first video stream, said second video stream, said third video stream and said fourth video stream and (b) a metadata channel separate from said first video stream, said second video stream, said third video stream and said fourth video stream.

18. An apparatus comprising:
a plurality of image modules each comprising (i) a sensor configured to capture images and (ii) a lens mounted to said sensor;
a plurality of processors each configured to (A) receive said images from a subset of said plurality of image modules and (B) generate a plurality of video streams, wherein (i) each one of said video streams is generated by one of said processors in response to said images received from one of said image modules, (ii) said subset of said plurality of image modules comprises at least two distinct image modules of said plurality of image modules and (iii) said lenses are arranged to allow said images to provide coverage for a spherical field of view of a scene surrounding the apparatus; and
a communication circuit configured to (i) receive said plurality of video streams packaged by said plurality of processors, (ii) forward said plurality of video streams into a single transmission and (iii) transmit said single transmission to a network, wherein said single transmission transmits said plurality of video streams on a first in first out basis.

19. The apparatus according to claim 18, wherein said single transmission comprises single stream with a plurality of separately encoded subparts corresponding to each of said plurality of video streams.

20. The apparatus according to claim 18, wherein said apparatus uses said communication circuit to transmit said single transmission without storing said plurality of video streams.

* * * * *